(12) United States Patent
Lee et al.

(10) Patent No.: US 12,033,588 B2
(45) Date of Patent: Jul. 9, 2024

(54) MODULATION OF DISPLAY RESOLUTION USING MACRO-PIXELS IN DISPLAY DEVICE

(71) Applicant: Meta Platforms Technologies, LLC, Menlo Park, CA (US)

(72) Inventors: Yongman Lee, Sunnyvale, CA (US); Qianqian Wang, Santa Clara, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/125,727

(22) Filed: Mar. 24, 2023

(65) Prior Publication Data

US 2023/0306909 A1  Sep. 28, 2023

Related U.S. Application Data

(60) Provisional application No. 63/339,286, filed on May 6, 2022, provisional application No. 63/323,966, filed on Mar. 25, 2022.

(51) Int. Cl.
*G09G 3/3275* (2016.01)
*G06F 3/01* (2006.01)
(Continued)

(52) U.S. Cl.
CPC .......... *G09G 3/3275* (2013.01); *G06F 3/013* (2013.01); *G09G 3/3233* (2013.01);
(Continued)

(58) Field of Classification Search
CPC .. G09G 3/3275; G09G 3/3233; G09G 3/3266; G09G 2300/0852;
(Continued)

(56) References Cited

U.S. PATENT DOCUMENTS 8,681,185 B2 * 3/2014 Guncer .................. G09G 3/342
345/204
8,970,646 B2 * 3/2015 Guncer ................ G09G 3/2018
345/55
(Continued)

FOREIGN PATENT DOCUMENTS

GB          2563960 A       1/2019

OTHER PUBLICATIONS

International Search Report and Written Opinion for International Application No. PCT/US2023/016376, dated Aug. 22, 2023, 26 pages.
(Continued)

*Primary Examiner* — Michael J Jansen, II
(74) *Attorney, Agent, or Firm* — Weaver Austin Villeneuve & Sampson LLP

(57) ABSTRACT

Embodiments relate to a foveated display, in which a display device receives image data to be displayed that comprises a plurality of display regions associated with different image resolutions, and metadata that is indicative of locations of the plurality of display regions associated with different image resolutions. A display driver integrated circuit (DDIC) of the display device comprises an expander circuit configured to determine locations of one or more macropixels to be displayed by the display area based on the received metadata, wherein each macropixel corresponds to a grouping of native pixels of the display area onto which image data is loaded to concurrently.

21 Claims, 22 Drawing Sheets

(51) Int. Cl.
*G09G 3/3233* (2016.01)
*G09G 3/3266* (2016.01)

(52) U.S. Cl.
CPC ... *G09G 3/3266* (2013.01); *G09G 2300/0852* (2013.01); *G09G 2310/0213* (2013.01); *G09G 2310/0297* (2013.01); *G09G 2310/08* (2013.01); *G09G 2330/021* (2013.01); *G09G 2340/02* (2013.01); *G09G 2340/0435* (2013.01); *G09G 2354/00* (2013.01); *G09G 2370/00* (2013.01)

(58) Field of Classification Search
CPC ... G09G 2310/0213; G09G 2310/0297; G09G 2310/08; G09G 2330/021; G09G 2340/02; G09G 2340/0435; G09G 2354/00; G09G 2370/00; G06F 3/013
See application file for complete search history.

(56) References Cited

U.S. PATENT DOCUMENTS

| | | | |
|---|---|---|---|
| 10,242,634 B2 | 3/2019 | Sang et al. | |
| 10,403,704 B2* | 9/2019 | Chae | H10K 59/126 |
| 10,867,560 B2* | 12/2020 | Yoon | H10K 59/352 |
| 10,885,883 B2* | 1/2021 | Knez | G09G 3/2092 |
| 11,263,977 B2 | 3/2022 | Kim et al. | |
| 11,335,227 B2* | 5/2022 | Seauve | G11C 19/28 |
| 2006/0064716 A1* | 3/2006 | Sull | G06F 16/784 715/201 |
| 2010/0007804 A1* | 1/2010 | Guncer | G09G 3/2085 348/E3.015 |
| 2010/0225679 A1* | 9/2010 | Guncer | G09G 3/342 345/690 |
| 2013/0241959 A1 | 9/2013 | Ge et al. | |
| 2013/0257703 A1 | 10/2013 | Huang | |
| 2014/0092006 A1* | 4/2014 | Boelter | G09G 5/363 345/156 |
| 2016/0189640 A1 | 6/2016 | Guo et al. | |
| 2016/0189795 A1 | 6/2016 | Chen | |
| 2016/0379538 A1* | 12/2016 | Yan | G09G 3/20 345/698 |
| 2017/0221979 A1* | 8/2017 | Chae | H10K 59/131 |
| 2017/0236466 A1 | 8/2017 | Spitzer et al. | |
| 2017/0243528 A1 | 8/2017 | Ji et al. | |
| 2018/0286302 A1 | 10/2018 | Feng | |
| 2019/0005884 A1 | 1/2019 | Yoo | |
| 2019/0088184 A1 | 3/2019 | Morein | |
| 2019/0164502 A1* | 5/2019 | Yoon | H10K 59/353 |
| 2019/0172399 A1 | 6/2019 | Chen et al. | |
| 2019/0189060 A1 | 6/2019 | Takasugi | |
| 2019/0221185 A1 | 7/2019 | Grossman et al. | |
| 2019/0237021 A1 | 8/2019 | Peng et al. | |
| 2019/0355332 A1* | 11/2019 | Knez | G09G 3/2092 |
| 2019/0378463 A1 | 12/2019 | Chung et al. | |
| 2020/0234625 A1* | 7/2020 | Seauve | G11C 19/28 |
| 2020/0242997 A1 | 7/2020 | Xue et al. | |
| 2020/0335056 A1 | 10/2020 | Feng et al. | |
| 2021/0142736 A1 | 5/2021 | Chen et al. | |
| 2021/0166656 A1 | 6/2021 | Atkinson | |
| 2021/0183318 A1 | 6/2021 | Kim et al. | |
| 2021/0233483 A1 | 7/2021 | Huang | |

OTHER PUBLICATIONS

International Search Report and Written Opinion for International Application No. PCT/US2023/016385, dated Aug. 22, 2023, 25 pages.
Invitation to Pay Additional Fees for International Application No. PCT/US2023/016376 dated Jun. 30, 2023, 19 pages.
Invitation to Pay Additional Fees for International Application No. PCT/US2023/016385 dated Jun. 30, 2023, 18 pages.
Vieri C., et al., "An 18 megapixel 4.3" 1443 ppi 120 Hz OLED Display for Wide Field of View High Acuity Head Mounted Displays," Journal of the Society for Information Display, Jan. 1, 2018, vol. 26, No. 5, pp. 314-324.
International Search Report and Written Opinion for International Application No. PCT/US2023/017235, dated Aug. 11, 2023, 10 pages.
Non-Final Office Action dated Oct. 5, 2023 for U.S. Appl. No. 18/125,711, filed Mar. 23, 2023, 25 pages.
Non-Final Office Action dated Dec. 21, 2023 for U.S. Appl. No. 18/126,190, filed Mar. 24, 2023, 13 pages.

* cited by examiner

MODULATION OF DISPLAY RESOLUTION USING MACRO-PIXELS IN DISPLAY DEVICE

CROSS REFERENCE TO RELATED APPLICATIONS

This application claims a priority and benefit to U.S. Provisional Patent Application Ser. No. 63/323,966, filed Mar. 25, 2022, and U.S. Provisional Patent Application Ser. No. 63/339,286, filed May 6, 2022, which are hereby incorporated by reference in its entireties.

BACKGROUND

This disclosure relates to a display device, and specifically to light emitting diode (LED) or OLED (organic LED) related display which can have configurable resolution.

A display device is often used in a virtual reality (VR) or augmented-reality (AR) system as a head-mounted display (HMD) or a near-eye display (NED). To display high resolution images, it is beneficial to increase the number of pixels in the display device and operate the display device with a higher frame rate. However, when there is an increased number of pixels in a display device being operated at a higher frame rate, time allocated for preparing and writing of data to pixels are reduced. In addition, utilization of an increased number of pixels may result in higher charging frequency, increasing power consumption.

SUMMARY

In some aspects, the techniques described herein relate to a method, including: receiving image data to be displayed by a display device, wherein the image data includes a plurality of display regions associated with different image resolutions; generating metadata based on the received image data, wherein the metadata is indicative of locations of the plurality of display regions associated with different image resolutions; transmitting the image data along with the generated metadata to the display device; at a display driver integrated circuit (DDIC) of the display device, where the display device includes a display area including a plurality of pixels arranged in a plurality of rows and columns: receiving the transmitted image data with the metadata; determining locations of one or more macro pixels to be displayed by the display area based on the metadata, wherein each macro pixel corresponds to a grouping of native pixels of the display area onto which image data is loaded to concurrently; configuring control signals for grouping rows and columns of the display area with a determined timing based on the determined macro pixel locations; displaying image data by providing the control signals in accordance with the determined timing.

In some aspects, the techniques described herein relate to a display device, including: a display driver integrated circuit (DDIC) including: a receiver configured to receive image data to be displayed by the display device, wherein the image data includes a plurality of display regions associated with different image resolutions, and metadata indicative of locations of the plurality of display regions associated with different image resolutions; an expander circuit configured to: determine locations of one or more macro pixels to be displayed by the display area based on the metadata, wherein each macro pixel corresponds to a grouping of native pixels of the display area onto which image data is loaded to concurrently; and configure control signals for grouping rows and columns of the display area with a determined timing based on the determined macro pixel locations; and a source driver circuit; a display area including a plurality of pixels arranged in a plurality of rows and columns, each row including a respective gate line configured to provide a gate enable signal to pixels of the row, and each column including a respective data line configured to provide image data to pixels of the column, a demultiplexer connected to a signal line from a source drive circuit, and configured to selectively couple data lines of a set of data lines of the respective data lines to the signal line to charge the data lines in accordance with the control signals; wherein the control signals are provided to the demultiplexer to concurrently couple a plurality of data lines of the set of data lines to the signal line period to concurrently charge the plurality of data lines during one or more time periods, based upon the determined macro pixels locations.

The figures depict embodiments of the present disclosure for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1A:
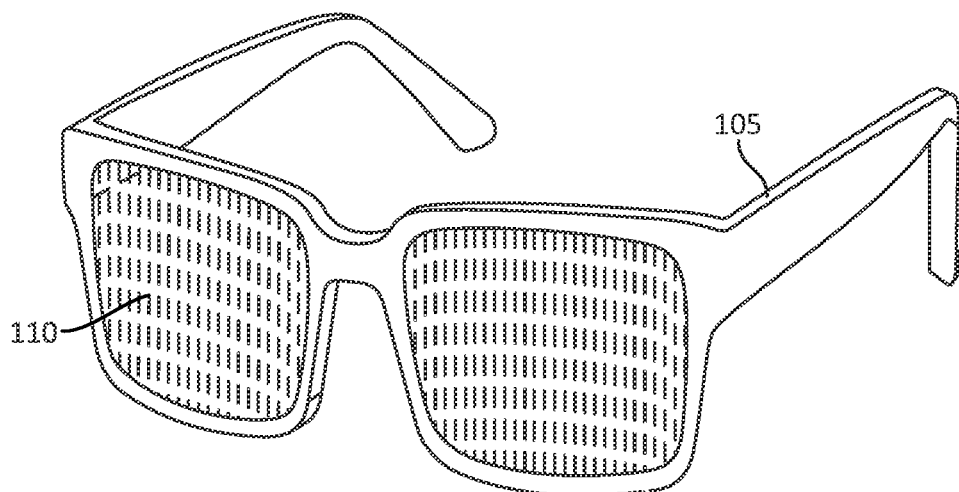
FIGS. 1A and 1B are diagrams of head-mounted displays (HMDs) that include near-eye displays (NED), according to some embodiments.
Figure 1B:
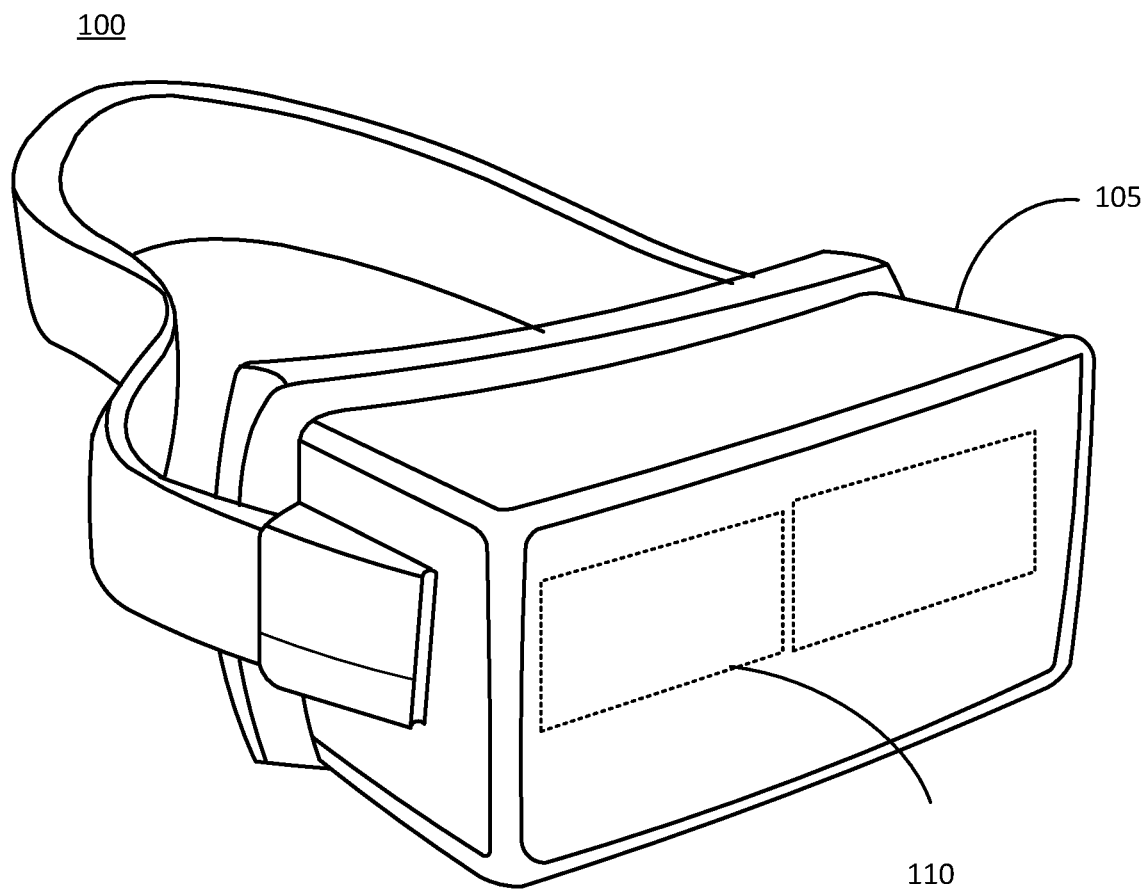

FIGS. 1A and 1B are diagrams of head-mounted displays (HMDs) 100 that include near-eye displays (NED) 110, according to some embodiments. The NED 110 may present media to a user. Examples of media that may be presented by the NED 110 include one or more images, video, audio, or some combination thereof. In some embodiments, audio may be presented via an external device (e.g., speakers and/or headphones) that receives audio information from the HMD 100, a console (not shown), or both, and presents audio data to the user based on the audio information. The HMD 100 is generally configured to operate as a virtual reality (VR) HMD. However, in some embodiments, the HMD 100 may be modified to also operate as an augmented reality (AR) HMD, a mixed reality (MR) HMD, or some combination thereof. For example, in some embodiments, the HMD 100 may augment views of a physical, real-world environment with computer-generated elements (e.g., still images, video, sound, etc.).

The HMD 100 shown in FIG. 1A or 1B may include a frame 105 and a display 110. The frame 105 may include one or more optical elements that together display media to a user. That is, the display 110 may be configured for a user to view the content presented by HMD 100. As discussed below in conjunction with FIG. 2, the display 110 may include at least one source assembly to generate image light to present optical media to an eye of the user. The source assembly may include, e.g., a source, an optics system, or some combination thereof.

FIGS. 1A and 1B are merely examples of a virtual reality system, and the display systems described herein may be incorporated into further such systems.

Figure 2:
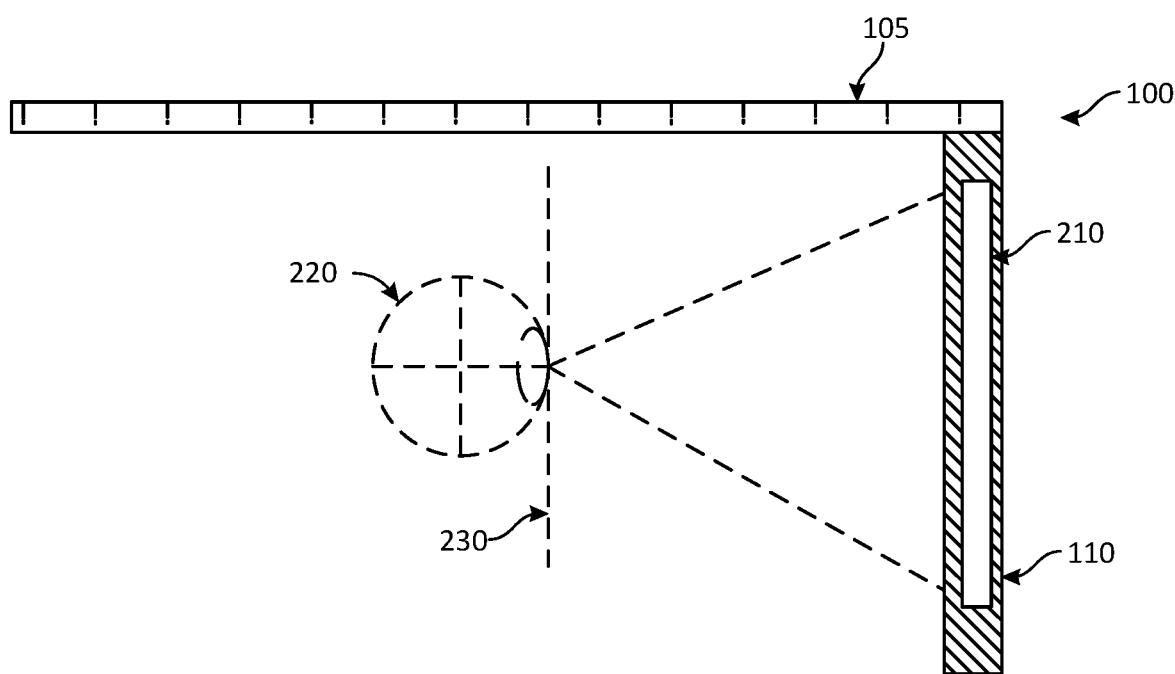
FIG. 2 is a cross-sectional view of the HMD illustrated in FIG. 1A or 1B, according to some embodiments.

FIG. 2 is a cross section 200 of the HMD 100 illustrated in FIG. 1A or 1B, in accordance with some embodiments of the present disclosure. The cross section 200 may include at least one display assembly 210, and an exit pupil 230. The exit pupil 230 is a location where the eye 220 may be positioned when the user wears the HMD 100. In some embodiments, the frame 105 may represent a frame of eye-wear glasses. For purposes of illustration, FIG. 2 shows the cross section 200 associated with a single eye 220 and a single display assembly 210, but in alternative embodiments not shown, another display assembly that is separate from or integrated with the display assembly 210 shown in FIG. 2, may provide image light to another eye of the user.

The display assembly 210 may direct the image light to the eye 220 through the exit pupil 230. The display assembly 210 may be composed of one or more materials (e.g., plastic, glass, etc.) with one or more refractive indices that effectively decrease the weight and widen a field of view of the HMD 100.

In alternate configurations, the HMD 100 may include one or more optical elements (not shown) between the display assembly 210 and the eye 220. The optical elements may act to, by way of various examples, correct aberrations in image light emitted from the display assembly 210, magnify image light emitted from the display assembly 210, perform some other optical adjustment of image light emitted from the display assembly 210, or combinations thereof. Example optical elements may include an aperture, a Fresnel lens, a convex lens, a concave lens, a filter, or any other suitable optical element that may affect image light.

In some embodiments, the display assembly 210 may include a source assembly to generate image light to present media to a user's eyes. The source assembly may include, e.g., a light source, an optics system, or some combination thereof. In accordance with various embodiments, a source assembly may include a light-emitting diode (LED) such as a micro-LED, an organic light-emitting diode (OLED), or other type of LED. In some embodiments, the source assembly may correspond to other types of displays in which pixels are arranged in rows and columns, and connected to respective gate and data lines, such as a liquid crystal display (LCD).

Figure 3:
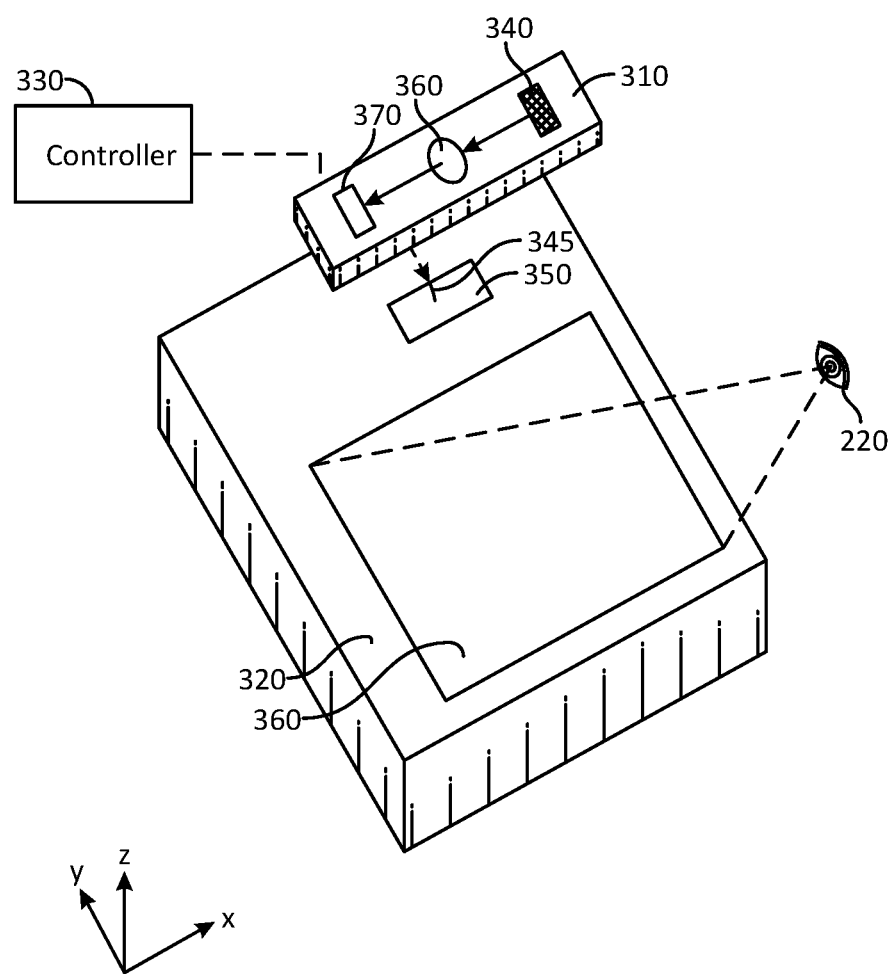
FIG. 3 illustrates a perspective view of a waveguide display, according to some embodiments.

FIG. 3 illustrates a perspective view of a waveguide display 300 in accordance with some embodiments. The waveguide display 300 may be a component (e.g., display assembly 210) of HMD 100. In alternate embodiments, the waveguide display 300 may constitute a part of some other HMD, or other system that directs display image light to a particular location.

The waveguide display 300 may include, among other components, a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300 may provide image light to another eye of the user. In a partially separate system, for instance, one or more components may be shared between waveguide displays for each eye.

The source assembly 310 generates image light. The source assembly 310 may include a source 340, a light conditioning assembly (e.g., a decoupling element 360), and a scanning mirror assembly 370. The source assembly 310 may generate and output image light 345 to a coupling element 350 of the output waveguide 320.

The source 340 may include a source of light that generates at least a coherent or partially coherent image light 345. The source 340 may emit light in accordance with one or more illumination parameters received from the controller 330. The source 340 may include one or more source elements, including, but not restricted to light emitting diodes, such as micro-OLEDs, as described in detail below with reference to FIGS. 4-7B. While the below description primarily describes the source 340 as comprising OLEDs and/or micro-OLEDs, it is understood that in other embodiments, the source 340 may comprise other types of source elements, such as micro-LEDs or an LCD.

The output waveguide 320 may be configured as an optical waveguide that outputs image light to an eye 220 of a user. The output waveguide 320 receives the image light 345 through one or more coupling elements 350 and guides the received input image light 345 to one or more decoupling elements 360. In some embodiments, the coupling element 350 couples the image light 345 from the source assembly 310 into the output waveguide 320. The coupling element 350 may be or include a diffraction grating, a holographic grating, some other element that couples the image light 345 into the output waveguide 320, or some combination thereof. For example, in embodiments where the coupling element 350 is a diffraction grating, the pitch of the diffraction grating may be chosen such that total internal reflection occurs, and the image light 345 propagates internally toward the decoupling element 360. For example, the pitch of the diffraction grating may be in the range of approximately 300 nm to approximately 600 nm.

The decoupling element 360 decouples the total internally reflected image light from the output waveguide 320. The decoupling element 360 may be or include a diffraction grating, a holographic grating, some other element that decouples image light out of the output waveguide 320, or some combination thereof. For example, in embodiments where the decoupling element 360 is a diffraction grating, the pitch of the diffraction grating may be chosen to cause incident image light to exit the output waveguide 320. An orientation and position of the image light exiting from the output waveguide 320 may be controlled by changing an orientation and position of the image light 345 entering the coupling element 350.

The output waveguide 320 may be composed of one or more materials that facilitate total internal reflection of the image light 345. The output waveguide 320 may be composed of, for example, silicon, glass, or a polymer, or some combination thereof. The output waveguide 320 may have a relatively small form factor such as for use in a head-mounted display. For example, the output waveguide 320 may be approximately 30 mm wide along an x-dimension, 50 mm long along a y-dimension, and 0.5-1 mm thick along a z-dimension. In some embodiments, the output waveguide 320 may be a planar (2D) optical waveguide.

The controller 330 may be used to control the scanning operations of the source assembly 310. In certain embodiments, the controller 330 may determine scanning instructions for the source assembly 310 based at least on one or more display instructions. Display instructions may include instructions to render one or more images. In some embodiments, display instructions may include an image file (e.g., bitmap). The display instructions may be received from, e.g., a console of a virtual reality system (not shown). Scanning instructions may include instructions used by the source assembly 310 to generate image light 345. The scanning instructions may include, e.g., a type of a source of image light (e.g. monochromatic, polychromatic), a scanning rate, an orientation of scanning mirror assembly 370, and/or one or more illumination parameters, etc. The controller 330 may include a combination of hardware, software, and/or firmware not shown here so as not to obscure other aspects of the disclosure.

According to some embodiments, source 340 may include a light emitting diode (LED), such as an organic light emitting diode (OLED). An organic light-emitting diode (OLED) is a light-emitting diode (LED) having an emissive electroluminescent layer that may include a thin film of an organic compound that emits light in response to an electric current. The organic layer is typically situated between a pair of conductive electrodes. One or both of the electrodes may be transparent.

As will be appreciated, an OLED display can be driven with a passive-matrix (PMOLED) or active-matrix (AMOLED) control scheme. In a PMOLED scheme, each row (and line) in the display may be controlled sequentially, whereas AMOLED control typically uses a thin-film transistor backplane to directly access and switch each individual pixel on or off, which allows for higher resolution and larger display areas.

In other embodiments, the OLED display is embodied as part of a display panel that does not include any waveguide. The OLED display may be a screen that is viewable directly by to the user's eye instead of passing light through a waveguide.

Figure 4:
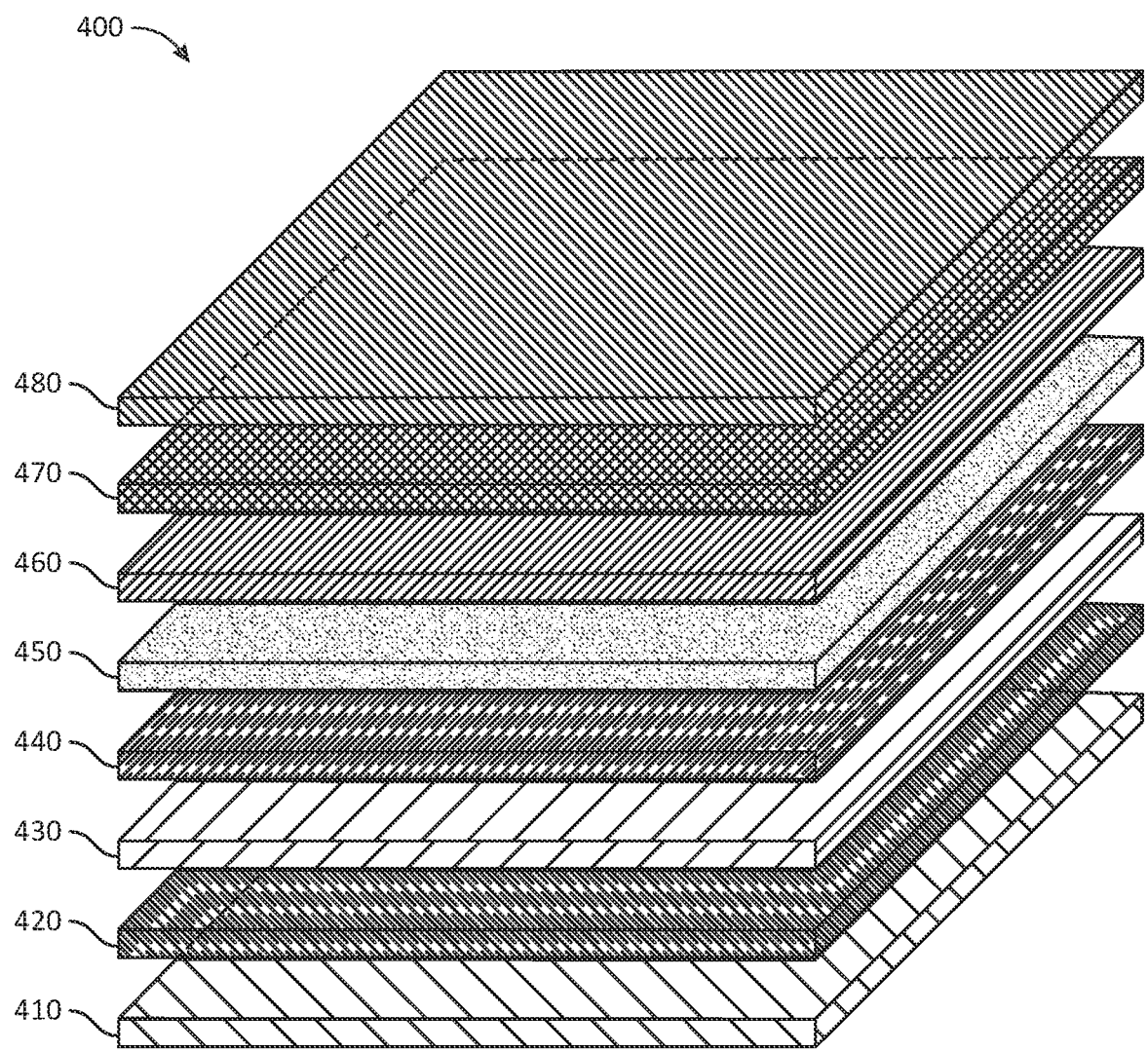
FIG. 4 depicts a simplified organic light emitting diode (OLED) structure, according to some embodiments.

FIG. 4 depicts a simplified OLED structure according to some embodiments. As shown in an exploded view, OLED 400 may include, from bottom to top, a substrate 410, anode 420, hole injection layer 430, hole transport layer 440, emissive layer 450, blocking layer 460, electron transport layer 470, and cathode 480. In some embodiments, substrate (or backplane) 410 may include single crystal or polycrystalline silicon or other suitable semiconductor (e.g., germanium).

Anode 420 and cathode 480 may include any suitable conductive material(s), such as transparent conductive oxides (TCOs, e.g., indium tin oxide (ITO), zinc oxide (ZnO), and the like). The anode 420 and cathode 480 are configured to inject holes and electrons, respectively, into one or more organic layer(s) within emissive layer 450 during operation of the device.

The hole injection layer 430, which is disposed over the anode 420, receives holes from the anode 420 and is configured to inject the holes deeper into the device, while the adjacent hole transport layer 440 may support the transport of holes to the emissive layer 450. The emissive layer 450 converts electrical energy to light. Emissive layer 450 may include one or more organic molecules, or light-emitting fluorescent dyes or dopants, which may be dispersed in a suitable matrix as known to those skilled in the art.

Blocking layer 460 may improve device function by confining electrons (charge carriers) to the emissive layer 450. Electron transport layer 470 may support the transport of electrons from the cathode 480 to the emissive layer 450.

In some embodiments, the generation of red, green, and blue light (to render full-color images) may include the formation of red, green, and blue OLED sub-pixels in each pixel of the display. Alternatively, the OLED 400 may be adapted to produce white light in each pixel. The white light may be passed through a color filter to produce red, green, and blue sub-pixels.

Any suitable deposition process(es) may be used to form OLED 400. For example, one or more of the layers constituting the OLED may be fabricated using physical vapor deposition (PVD), chemical vapor deposition (CVD), evaporation, spray-coating, spin-coating, atomic layer deposition (ALD), and the like. In further aspects, OLED 400 may be manufactured using a thermal evaporator, a sputtering system, printing, stamping, etc.

According to some embodiments, OLED 400 may be a micro-OLED. A "micro-OLED," in accordance with various examples, may refer to a particular type of OLED having a small active light emitting area (e.g., less than 2,000 µm2 in some embodiments, less than 20 µm2 or less than 10 µm2 in other embodiments). In some embodiments, the emissive surface of the micro-OLED may have a diameter of less than approximately 2 µm. Such a micro-OLED may also have collimated light output, which may increase the brightness level of light emitted from the small active light emitting area.

Figure 5:
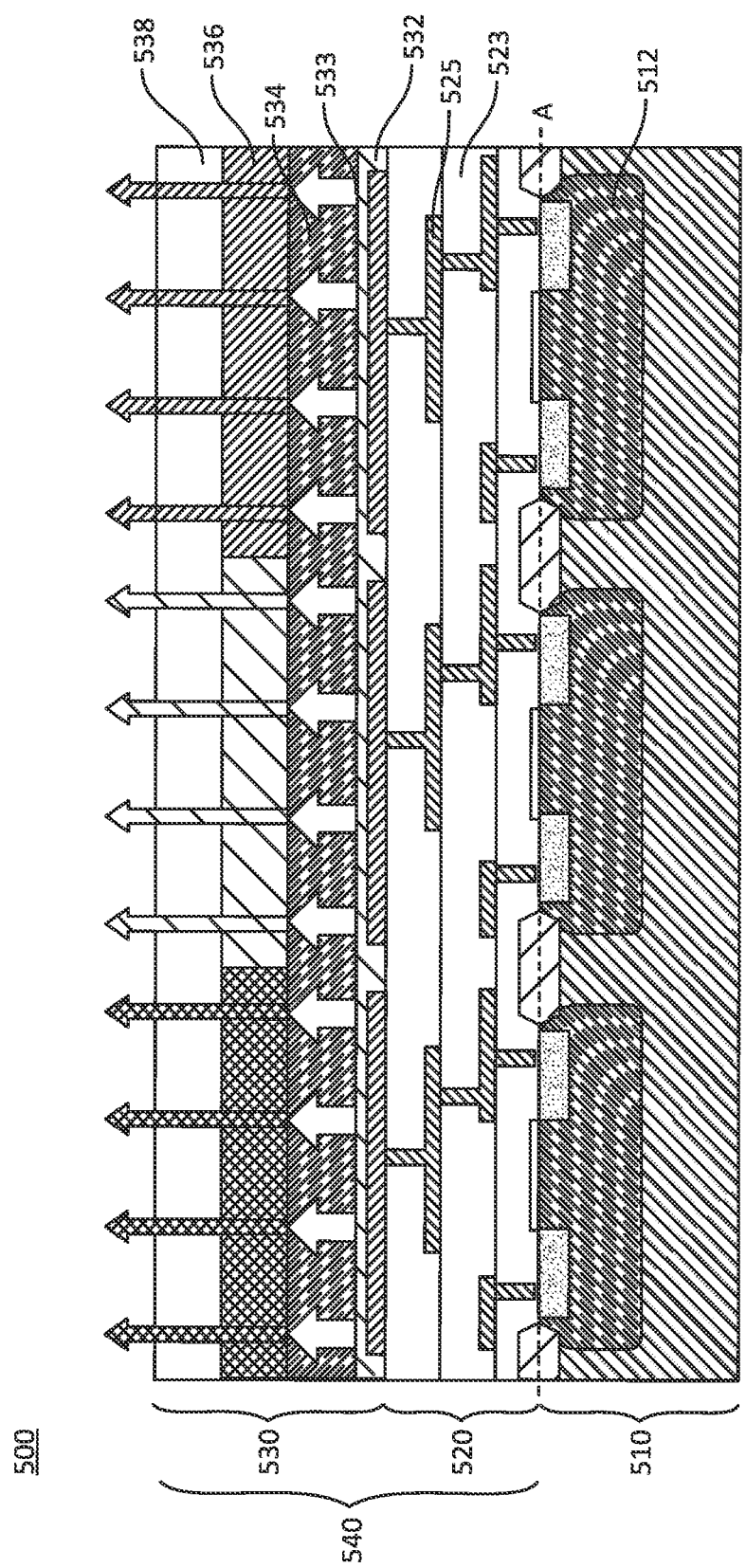
FIG. 5 is a schematic view of an OLED display device architecture including a display driver integrated circuit (DDIC), according to some embodiments.

FIG. 5 is a schematic view of an OLED display device architecture including a display driver integrated circuit (DDIC) 510 according to some embodiments. According to some embodiments, OLED display device 500 (e.g., micro-OLED chip) may include an active display area 530 having an active matrix 532 (such as OLED 400) disposed over a single crystal (e.g., silicon) backplane 520. The combined display/backplane architecture, i.e., display element 540 may be bonded (e.g., at or about interface A) directly or indirectly to the DDIC 510. As illustrated in FIG. 5, DDIC 510 may include an array of driving transistors 512, which may be formed using conventional CMOS processing. One or more display driver integrated circuits may be formed over a single crystal (e.g., silicon) substrate.

In some embodiments, the active display area 530 may have at least one areal dimension (i.e., length or width) greater than approximately 1.3 inches, e.g., approximately 1.4, 1.5, 1.6, 1.7, 1.8, 1.9, 2.0, 2.25, 2.5, 2.75, or 3 inches, including ranges between any of the foregoing values, although larger area displays are contemplated.

Backplane 520 may include a single crystal or polycrystalline silicon layer 523 having a through silicon via 525 for electrically connecting the DDIC 510 with the active display area 530. In some embodiments, active display area 530 may further include a transparent encapsulation layer 534 disposed over an upper emissive surface 533 of active matrix 532, a color filter 536, and cover glass 538.

According to various embodiments, the active display area 530 and underlying backplane 520 may be manufactured separately from, and then later bonded to, DDIC 510, which may simplify formation of the OLED active area, including formation of the active matrix 532, color filter 536, etc.

The DDIC 510 may be directly bonded to a back face of the backplane opposite to active matrix 532. In further embodiments, a chip-on-flex (COF) packaging technology may be used to integrate display element 540 with DDIC 510, optionally via a data selector (i.e., multiplexer) array (not shown) to form OLED display device 500. As used herein, the terms "multiplexer" or "data selector" may, in some examples, refer to a device adapted to combine or select from among plural analog or digital input signals, which are transmitted to a single output. Multiplexers may be used to increase the amount of data that can be communicated within a certain amount of space, time, and bandwidth.

As used herein, "chip-on-flex" (COF) may, in some examples, refer to an assembly technology where a microchip or die, such as an OLED chip, is directly mounted on and electrically connected to a flexible circuit, such as a direct driver circuit. In a COF assembly, the microchip may avoid some of the traditional assembly steps used for individual IC packaging. This may simplify the overall processes of design and manufacture while improving performance and yield.

In accordance with certain embodiments, assembly of the COF may include attaching a die to a flexible substrate, electrically connecting the chip to the flex circuit, and encapsulating the chip and wires, e.g., using an epoxy resin to provide environmental protection. In some embodiments, the adhesive (not shown) used to bond the chip to the flex substrate may be thermally conductive or thermally insulating. In some embodiments, ultrasonic or thermosonic wire bonding techniques may be used to electrically connect the chip to the flex substrate.

Figure 6:
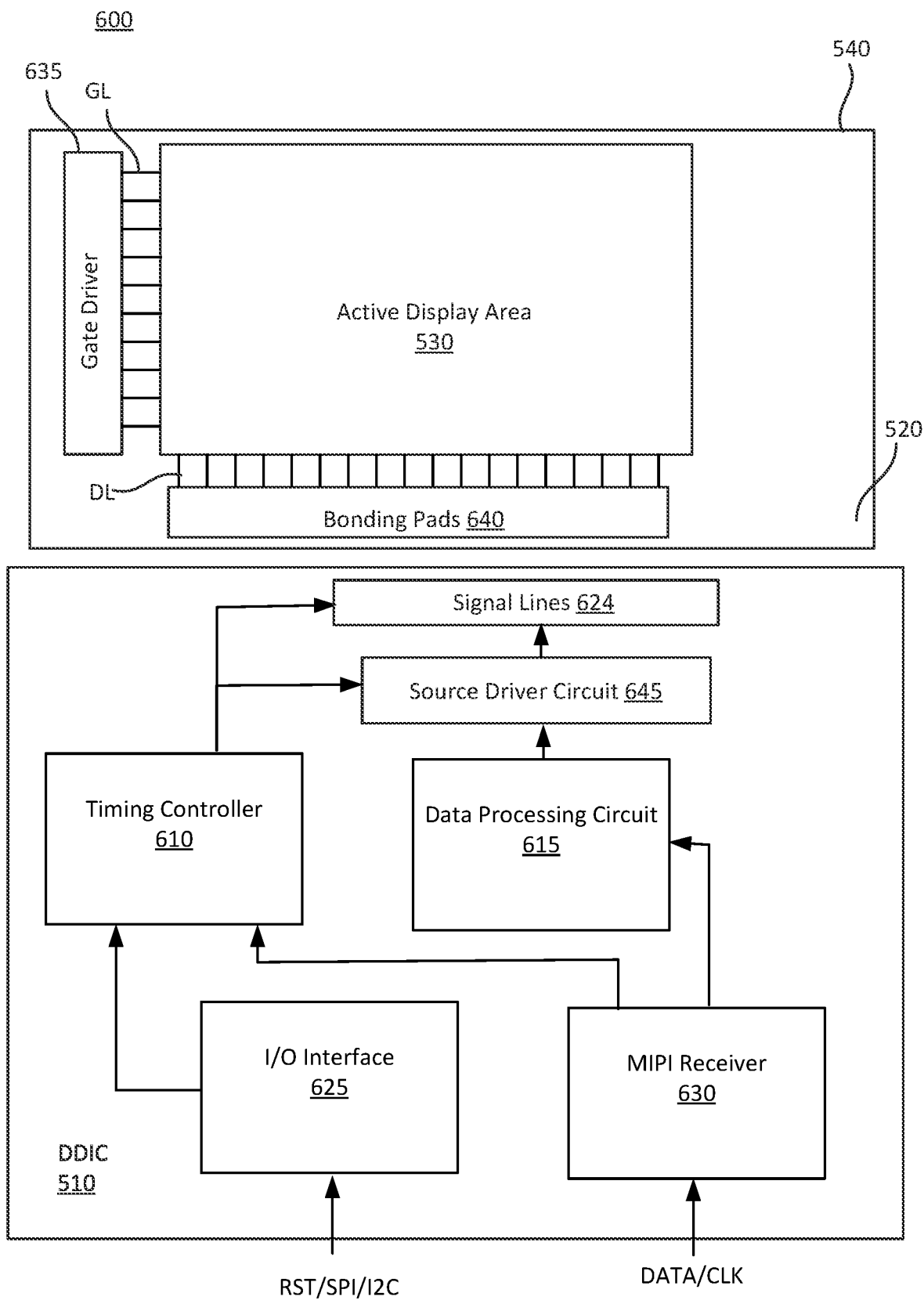
FIG. 6 is a schematic view of an OLED display device, according to some embodiments.

FIG. 6 is a schematic view of a display device 600 according to some embodiments. The display device 600 may be an OLED display device, and include, among other components, the DDIC 510 and the display element 540. The display element 540 may be an integrated circuit including the backplane 520, the active display area 530, bonding pads 640, and a control circuit for controlling the active display area 530. The control circuit may include a gate driver 635. The DDIC 510 may include a timing controller 610, a data processing circuit 615, an input/output (I/O) interface 625, a mobile industry processor interface (MIPI) receiver 630, a source driver circuit 645 and signal lines 624. In other embodiments, one or more components of the DDIC 510 may be disposed in the display element 540.

The timing controller 610 may be configured to generate timing control signals for the gate driver 635, the source driver circuit 645, and other components in the display element 540. The timing control signals may include one or more clock signals, a vertical synchronization signal, a horizontal synchronization signal, and a start pulse. However, timing control signals provided from the timing controller 610 according to embodiments of the present disclosure are not limited thereto.

The data processing circuit 615 may be configured to receive image data DATA from the MIPI receiver 630 and convert the data format of the image data DATA to generate data signals input to the source driver circuit 645 for displaying images in the active display area 530.

The I/O interface 625 is a circuit that receives control signals from other sources and sends operation signals to the timing controller 610. The control signals may include a reset signal RST to reset the display element 540 and signals according to serial peripheral interface (SPI) or inter-integrated circuit (I2C) protocols for digital data transfer. Based on the received control signals, the I/O interface 625 may process commands from a system on a chip (SoC), a central processing unit (CPU), or other system control chip.

The MIPI receiver 630 may be a MIPI display serial interface (DSI), which may include a high-speed packet-based interface for delivering video data to the pixels in the active display area 530. The MIPI receiver 630 may receive image data DATA and clock signals CLK and provide timing control signals to the timing controller 610 and image data DATA to the data processing circuit 615.

The active display area 530 may include a plurality of pixels arranged into rows and columns with each pixel including a plurality of subpixels (e.g., a red subpixel, a green subpixel, a blue subpixel). Each subpixel may be connected to a gate line GL and a data line DL and driven to emit light according to a data signal received through the connected data line DL when the connected gate line GL provides a gate-on signal to the subpixel.

The backplane 520 may include conductive traces for electrically connecting the pixels in the active display area 530, the gate driver 635, the source driver circuit 645, and the bonding pads 640. The bonding pads 640 are conductive regions on the backplane 520 that are electrically coupled to the signal lines 624 of the DDIC 510 to receive timing control signals from the timing controller 610, and data signals from the source driver circuit 645. The bonding pads 640 are connected to the gate driver 635 and other circuit elements in the backplane 520. In the embodiment illustrated in FIG. 6, the DDIC 510 generates data signals and timing control signals and transmits the signals to the bonding pads 640 of the display element 540. However, in other embodiments, the timing controller 610, the source driver circuit 645 and/or the data processing circuit 615 may be in the display element 540 instead of the DDIC 510. When the timing controller 610 and/or the data processing circuit 615 are on the display element 540, there may be fewer bonding pads 640 since the data signals and timing control signals may be directly transmitted to the corresponding component without a bonding pad 640.

The gate driver 635 may be connected to a plurality of gate lines GL and provide gate-on signals to the plurality of gate lines GL at appropriate times. The gate driver 635 includes a plurality of stages, where each stage is connected to a gate line GL that outputs gate-on signals to a row of pixels.

The source driver circuit 645 may receive data signals from the data processing circuit 615 and provide the data signals to the active display area 530 via data lines DL. The source driver circuit 645 may include a plurality of source drivers, each source driver connected to a column of pixels via a data line DL.

Figure 7A:
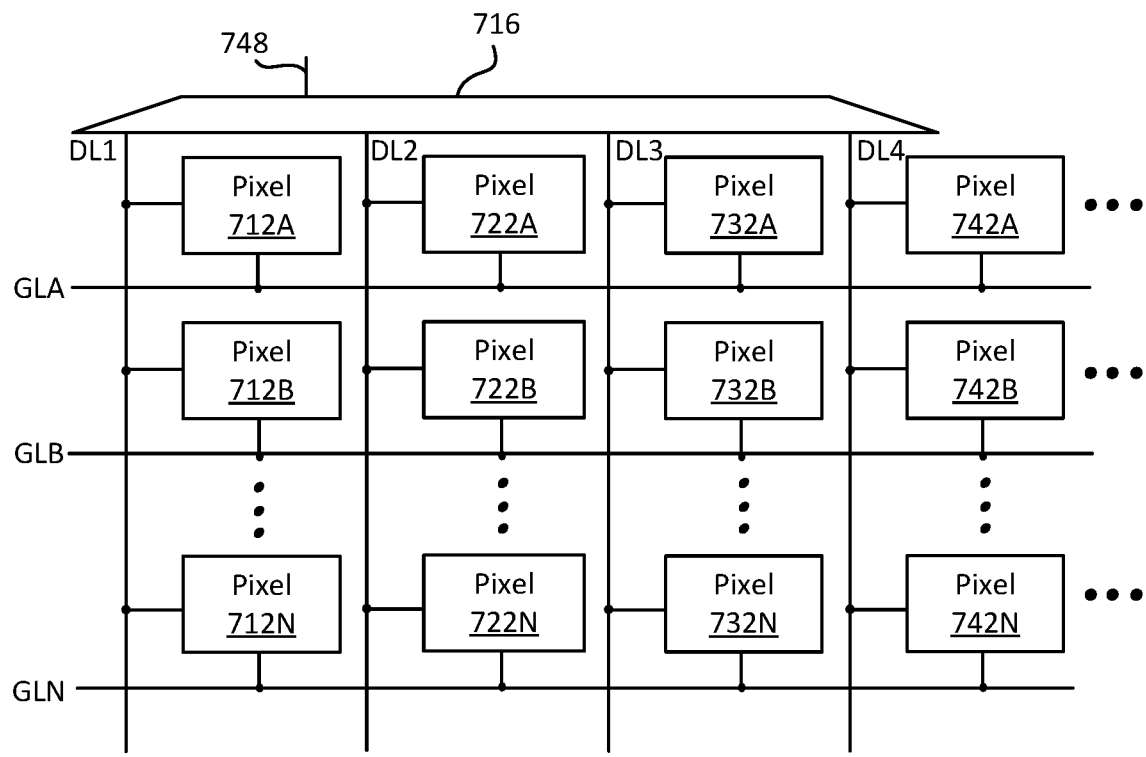
FIG. 7A illustrates an example pixel arrangement of a display device, according to some embodiments.

FIG. 7A illustrates an example pixel arrangement of a display device, according to some embodiments. The pixel arrangement includes, among others, columns of pixels 712A through 712N (collectively referred to also as "pixels 712" hereinafter), columns of pixels 722A through 722N (collectively referred to also as "pixels 722" hereinafter), columns of pixels 732A through 732N (collectively referred to also as "pixels 732" hereinafter), and columns of pixels 742A through 742N (collectively referred to also as "pixels 742" hereinafter). Although not illustrated in FIG. 7A, additional columns of pixels may be arranged at the right side and/or the left side of pixels columns shown. Each of pixels (e.g., pixel 712B) is connected to a corresponding data line (e.g., DL1) and a gate line (e.g., GLB). In some embodiments, each of the pixels 712, 722, 732, and 742 corresponds to an OLED pixel. In other embodiments, each pixel 712, 722, 732, and 742 another type of pixel, such as a micro-LED pixel, an LCD pixel, and/or the like.

Data lines (e.g., DL1 through DL4) are connected to a demultiplexer 716 that is connected to the source driver circuit 645 via the signal line 748 to receive multiplexed pixel data. Although only a single demultiplexer 716 is illustrated in FIG. 7A, other demultiplexers connected to different signal lines and other columns of pixels may be arranged at the right side and/or the left side of demultiplexer 716 to program additional columns of pixels. For example, in some embodiments, the display element comprises a plurality of demultiplexers, each connected to the source driver circuit 645 via a respective signal line and to a respective set of pixel columns via a respective set of data lines.

Pixel data $V_{DATA}$ for programming columns of pixels is time multiplexed by a multiplexer (not shown) and then demultiplexed by demultiplexer 716 so that fewer signal lines (e.g., line 748) may be used between the source driver circuit 645 and the array of pixels. Because each demultiplexer receives pixel data $V_{DATA}$ for programming pixels for its respective set columns of pixels in parallel, an amount of time needed to program all pixels for a particular row n of the display unit (referred to as a row period $T_{ROW}$) may be defined by an amount of time to program the pixels of the row n corresponding to a particular demultiplexer. Although it is beneficial to multiplex the pixel data for more data lines using the multiplexer and the demultiplexer, the settling time associated with a reference voltage for compensating the threshold voltage of driving transistors in the pixels may restrict the extent of multiplexing/demultiplexing.

In some embodiments, each of the pixels 712, 722, 732, and 742 correspond to subpixels associated with a specific color channel. For example, in some embodiments as discussed above, each pixel of the display contains three subpixels corresponding to red, green, and blue color channels. In some embodiments, the pixels 712, 722, 732, and 742 connected to a common demultiplexer 716 correspond to subpixels of different color channels. For example, pixels 712, 722, and 732 may correspond to red, green, and blue subpixels, respectively, for a given column of pixels, while pixels 742 correspond to red subpixels for another column of pixels. In other embodiments, the pixels 712, 722, 732, and 742 connected to a common demultiplexer 716 correspond to subpixels of the same color channel. For example, the pixels 712, 722, 732, and 742 may correspond to red subpixels for different columns of pixels of the display.

The gate lines GLA through GLN provide gate-on signals to pixels from the gate driver 635. In the example of FIG. 7A, each row of pixels is connected one of the gate lines GLA through GLN to receive a gate-on signal. The gate-on signal indicates when a row of pixels should be connected to a data line to receive pixel data for programming the pixels, by controlling a data selection switch (SEL) of each pixel (e.g., as shown in FIG. 7B), where the SEL switch is turned on when the gate-on signal is active but is turned off when the gate-on signal is inactive.

The display element 540 further includes timing signal lines (not shown) from the gate driver 635 to provide other timing signals. For example, the display element 540 may include horizontal lines carrying timing signals for operating various switches in the pixels, as described below with reference to FIG. 7B.

Figure 7B:
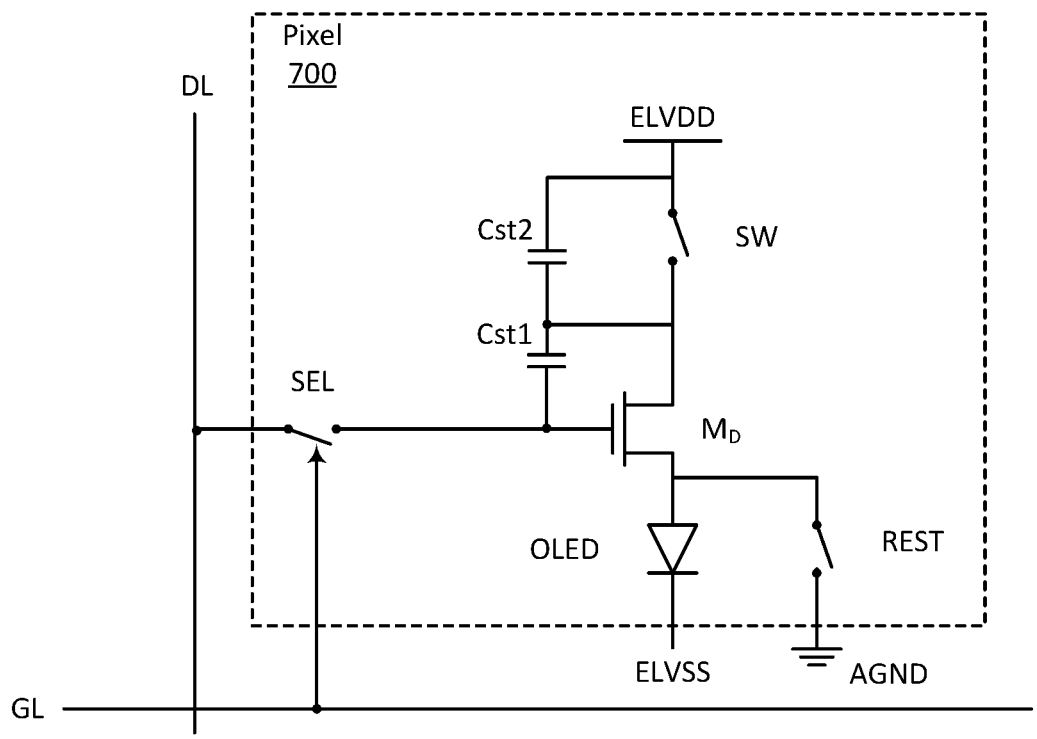
FIG. 7B is a circuit diagram of a pixel of a display device, according to some embodiments.

FIG. 7B is a circuit diagram of a pixel, according to some embodiments. The pixel 700 may be any of the pixels in the display element 540 including, but not limited to pixels 712, 722, 732, or 724. While FIG. 7B illustrates the pixel 700 as an OLED pixel, it is understood that in other embodiments, the pixels of the display element 540 may be implemented as other types of pixels (e.g., LED pixels, LCD pixels, etc.) The pixel 700 may include, among other components, switch SEL, a driving transistor $M_D$, an OLED, switch REST, switch SW, capacitor Cst1 and capacitor Cst2. The OLED is connected between a low voltage source ELVSS and a drain of the driving transistor $M_D$. When switch SW is turned on and switch REST is turned off, the driving transistor $M_D$ generates current in its drain that increases as a voltage stored by the storage capacitor Cst1 increases. The current is then provided to the OLED to drive the OLED. The OLED then generates light of intensity that corresponds to the amount of current provided by the driving transistor $M_D$.

The switch SEL controls a connection between the gate terminal of the driving transistor $M_D$ and the data line DL. When the gate line GL provides a gate-on signal (e.g., turns low), the switch SEL turns on, connecting the gate of the driving transistor $M_D$ to the data line DL and charging the storage capacitor Cst1 based on a voltage difference between the voltage of the pixel data at the data line DL and the high voltage level (ELVDD). When the gate-on signal is turned off in gate line GL, the switch SEL is turned off, disconnecting the gate of the driving transistor $M_D$ from the data line DL.

The switch REST enables or disables the current from the driving transistor $M_D$ to flow in the OLED. When the switch REST is turned on, current from the driving transistor $M_D$ flows through the switch REST to ground (AGND) that has a lower potential than the low voltage level ELVSS. Conversely, when the switch REST is turned off, the current from the driving transistor $M_D$ flows in the OLED.

The switch SW is turned on or off to couple a high voltage source ELVDD to a source of the driving transistor $M_D$. Capacitor Cst2 stores a voltage difference between the high voltage source ELVDD and the source of the driving transistor $M_D$ when the switch SW is turned off.

In some embodiments, driving transistor $M_D$, the selection switch (SEL), reset switch (RES), and emission switch (SW) are each implemented as P-channel metal-oxide-semiconductor (PMOS) transistors, where gate signals of the selection switch (SEL), reset switch (RES), and emission switch (SW) are controlled by the timing signals provided via the gate driver circuitry of the display. In other embodiments, one or more of these components may be implemented using other types of switches (e.g., an NMOS transistor).

In some embodiments, data is written to each row of pixels of a display panel (e.g., display element 540) of a display device sequentially. For example, in some embodiments, the gate driver 635 includes a pulsing or shifting gate signal (also referred to herein as an "enable pulse") that travels along a series of shift registers corresponding to the rows of the display panel. The enable pulse may serve as the gate-on signal provided along the gate line connecting a row of pixels, and each row of the display panel is programmed during a time period $T_{Row}$ (also referred to as a gate-on period or a row period) during which the enable pulse is provided to the gate line GL for the row. The frame rate of the display is based on a row period $T_{Row}$ for programming each row of the display panel. In addition, as discussed above, the pixels of each row are grouped based on one or more demultiplexers, where the row period $T_{Row}$ may be based on an amount of time to program the pixels of the row corresponding a particular demultiplexer.

In some embodiments, a display device is configured to group the programming of pixels of multiple rows and/or multiple columns, where the same data value is provided to each pixel of the multiple rows and/or multiple columns simultaneously, resulting in a "virtual pixel" made up of multiple native pixels (also referred to as a "macropixel"). For example, the display device may group native pixels within m columns by in rows (where m and in are integers, and at least one of m or n is greater than 1), where each pixel of the m columns and n rows is driven simultaneously to create an m×n macropixel. As used herein, columns may refer to pixels arranged in a direction parallel to the data lines of the display, while rows may refer to pixels arranged in a direction parallel to the gate lines of the display, even though certain figures may, for illustrative purposes, illustrate data lines extending in horizontal directions and gate lines extending in vertical directions.

In some embodiments, grouping of native pixels into macropixels is performed to reduce an overall effective resolution of the display panel. For example, by grouping 2×2 sets of native pixels into macropixels, the effective resolution of the display is reduced by a factor of 4. In other embodiments, grouping of pixels into macropixels is performed as part of implementing a foveated display, where different regions of the display panel are configured to display image data at different resolutions. For example, in some embodiments, the display device is configured to display image data within a first display region at a native resolution, and image data within one or more additional display regions at lower resolutions, based upon the size of the macropixels within each region. In some embodiments, the locations of each display region within the display are fixed (referred to as fixed foveated rendering, or FFR). In some embodiments, the locations of the display regions of a foveated display panel are configured dynamically based upon a gaze direction of the user (referred to as gaze-tracked foveated rendering, or GFR), e.g., where a region of display around the gaze direction of the user (e.g., centered on a location of the display corresponding to the user's gaze) is configured to display image data at a native resolution, whereas other regions of the display are configured to display image data at lower resolutions.

Figure 8:
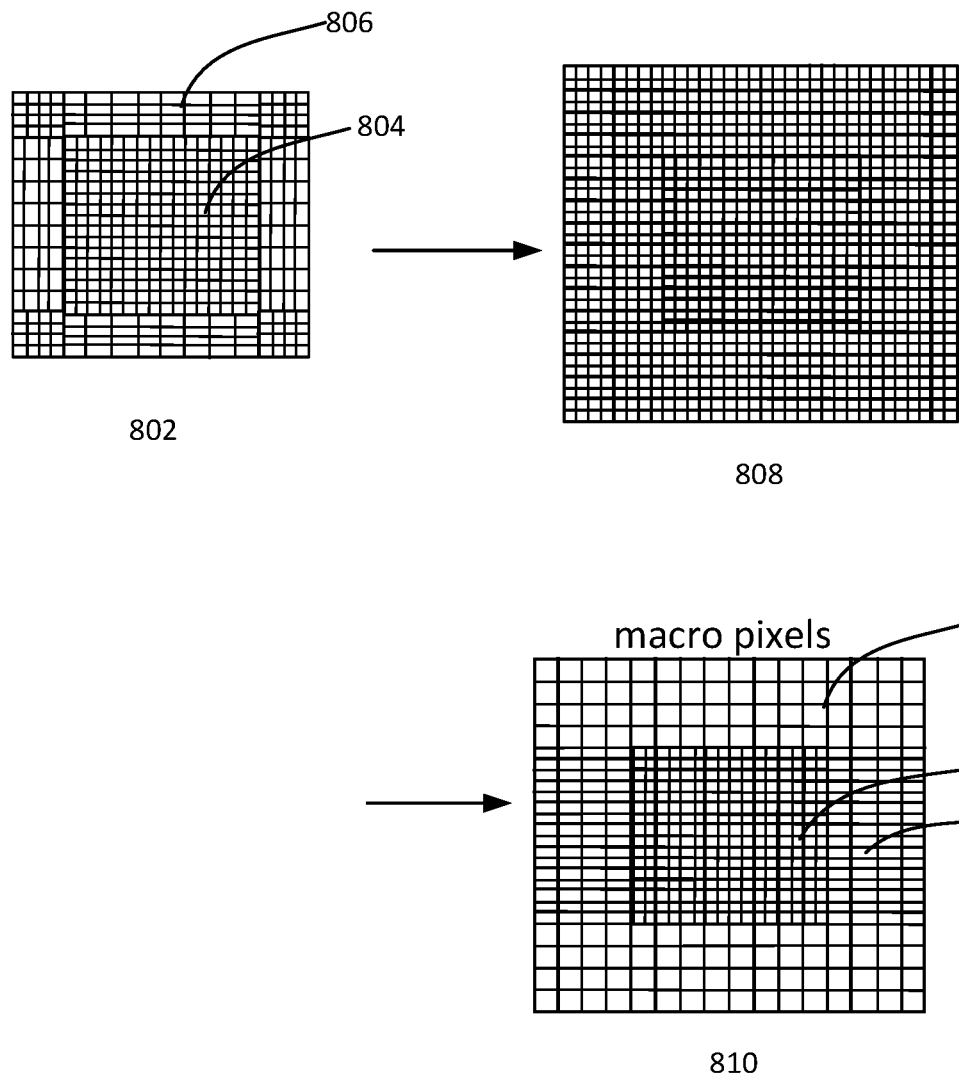
FIG. 8 illustrates a high level diagram showing implementation of a foveated display, in accordance with some embodiments.

FIG. 8 illustrates a high level diagram showing implementation of a foveated display, in accordance with some embodiments. In some embodiments, the display device receives input image data 802 to be displayed on the display panel, where the input image data 802 comprises first image data 804 at a first resolution (e.g., a native resolution of the display device) and second image data 806 at a second lower resolution. In embodiments where macropixel grouping is not used, the image data is upscaled (e.g., by mapping each pixel of the second image data 806 to a plurality of native pixels of the display) to generate the displayed image data 808, which is displayed entirely in the native resolution of the display device. On the other hand, in embodiments where macropixel grouping is used, the display image data 810 is displayed in a first region 812 using the native pixels of the display device, and in a second region 814 using macropixels comprising groups of native pixels programed concurrently using the same data. In some embodiments, different regions of the display may be associated with different macropixel grouping sizes. For example, the display image data 810 may further include a third region 816 comprising macropixels of a different size compared to those of the second region 814.

In some embodiments, by grouping native pixels into macropixels, power consumption of the display device may be reduced. In other embodiments, macropixel grouping is used to reduce increase a refresh rate of the display. In some embodiments, the use of macropixels allows for the use of displays with greater native resolutions than could be otherwise achieved for a given refresh rate. For example, in some embodiments, a display having above a certain native resolution (e.g., 5 k+ native resolution) would not be able to be implemented with a desired refresh rate (e.g., 90 Hz), due to a required minimum charging time needed for each row. However, by implementing a foveated display in which native pixels of the display are grouped into macropixels, the effective resolution of the display is lowered, allowing for use of displays with higher native resolution, while still maintaining a desired refresh rate.

Figure 9:
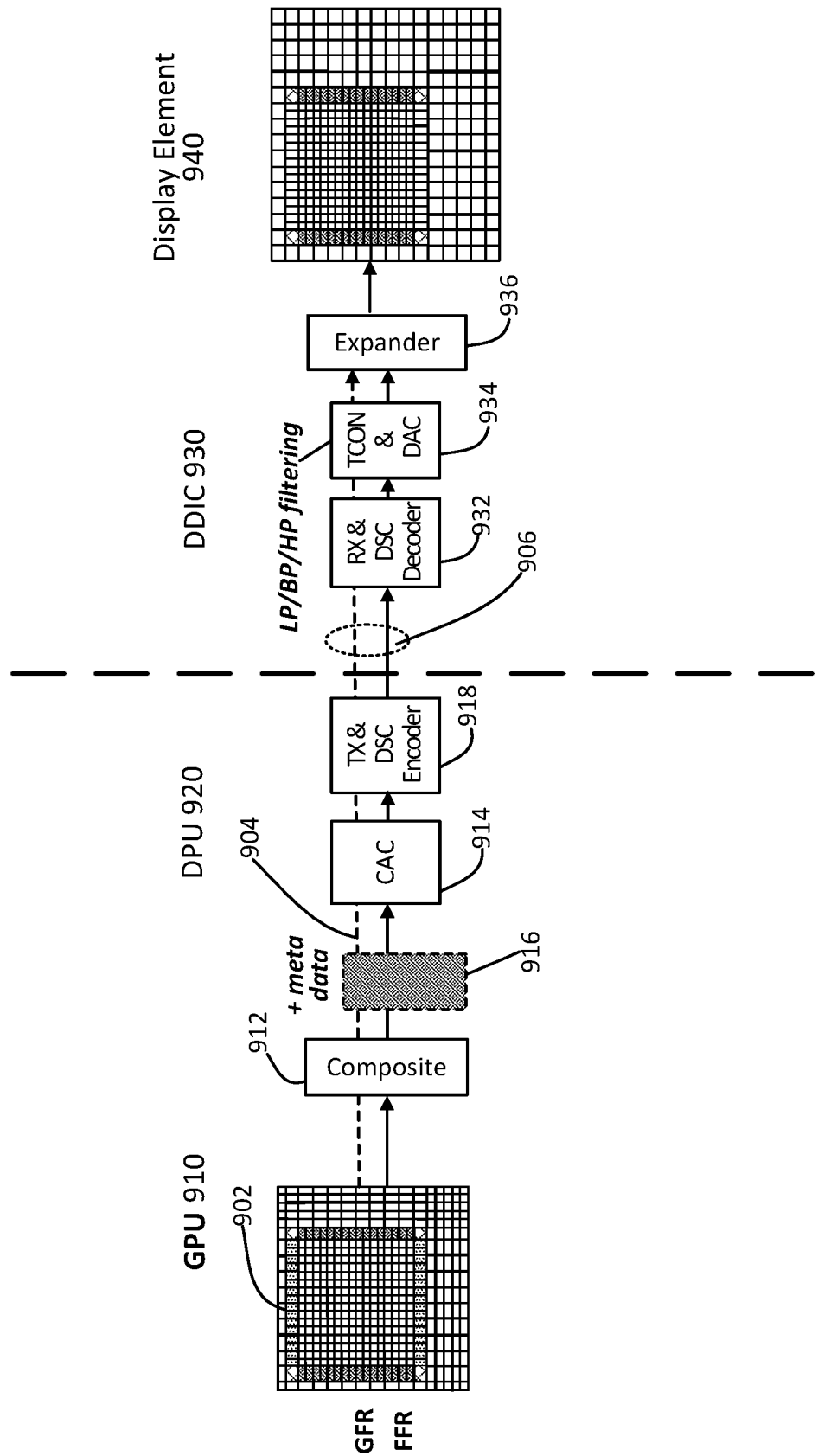
FIG. 9 illustrates a diagram showing foveated display architecture in accordance with some embodiments.

FIG. 9 illustrates a diagram showing foveated display architecture in accordance with some embodiments. In some embodiments, foveated image data 902 is initially generated at a graphics processing unit (GPU) 910, and processed at a display processing unit (DPU) 920 before being transmitted to the OLED display, which comprises DDIC 930 and display element 940 (which may correspond to the DDIC 510 and display element 540 illustrated in FIG. 6). In some embodiments, the GPU 910 and DPU 920 are part of the same system on chip (SoC). In some embodiments, the SoC may include multiple GPUs and/or multiple DPUs. In some embodiments, the GPU 910 and DPU 920 are located on a processor or console separate from the OLED display.

In some embodiments, GPU 910 and DPU 920 perform one or more image processing functions on the received foveated image data 902. For example, where the initial foveated image data 902 comprises multiple layers, the GPU 910 and DPU 920 may perform composite functions 912 on the image data 902 that combines the layers of the image data (e.g., into a single layer). In some embodiments, the DPU 920 performs color aberration compensation (CAC) 914 on the image data, which may be used to compensate for chromatic aberration caused by magnifying lenses used in VR or AR displays. In some embodiments, these functions may be performed on either the GPU 910 or the DPU 920.

The metadata generation module 916 generates metadata 904 associated with the foveated image data 902. In some embodiments, the metadata generation module 916 collects metadata received from the CPU or GPU describing the foveated image data 902. In some embodiments, the generated metadata specifying locations of two or more display regions of the display, an effective resolution and/or macropixel size of each display region, or some combination thereof. In other embodiments, where the display is configured to implement GFR, the metadata may indicate a gaze location, whereupon the DDIC determines the locations of different display regions based on the received gaze location (e.g., a central display region of native resolution centered on the gaze location, one or more peripheral display regions of lower effective resolution outside the central region, etc.). In some embodiments, the image data 902 may be of a native resolution, and the metadata 904 is used by the DDIC to downsample portions of the image data 902 to generate foveated image data. In some embodiments, the metadata generation module 916 generates the metadata in a format that is compatible with display stream compression algorithms such as Display Stream Compression (DSC) or VESA Display Compression-M (VDC-M), in order to facilitate transmission of the metadata from the GPU 910/DPU 920 to the DDIC 930. While FIG. 9 shows the metadata generation module 916 generating the metadata for the foveated image data 902 between performance of different image processing functions (e.g., between performance of composite functions 912 and CAC 914), it is understood that in other embodiments, the metadata generation module 916 may generate the metadata for foveated image data 902 before performance of the image processing functions, or after performance of different image processing functions. In some embodiments, the metadata generation module 916 may be located on the GPU 910, while in other embodiments, the metadata generation module 916 may be located on the DPU 920.

Transmitter 918 encodes the foveated image data 902 and the generated metadata 904 into a stream of packets 906, to be transmitted to the DDIC 930. In some embodiments, the transmitter 918 comprises an encoder that encodes the packets using a compression algorithm, e.g., DSC, VDC-M, etc. In some embodiments, the transmitter 918 encodes portion of the image data 902 and the metadata 904 into common packets. In other embodiments, the transmitter 918 encodes the image data 902 and the metadata 904 into separate packets. In embodiments where dual transmission channels are available, the image data and metadata may be transmitted via separate channels. In other embodiments where only one channel is available, packets of image data and metadata may be multiplexed, or metadata may be embedded as part of the packets of image data.

The DDIC 930 receives the packets 906 comprising the foveated image data 902 and metadata 904 via a receiver 932, which decodes the received packets to retrieve the foveated image data 902 and metadata 904. In some embodiments, the receiver 932 may correspond to the MIPI receiver 630 illustrated in FIG. 6. In some embodiments, the DDIC 930 performs one or more image processing functions 934 on the received foveated image data 902, such as digital to analog conversation (DAC) and filtering such as low-pass (LP), band-pass (BP), or high-pass (HP) filtering. The image processing functions 934 may also include a timing control circuit (TCON). In some embodiments, the TCON generates the timing of control signals (e.g., demultiplexer control signals, row enable pulse, etc.) for configuring the pixels of the display (described in greater detail below).

The DDIC 930 includes an expander circuit (or "expander") 936 configured synthesize the locations of macropixels to be displayed by the display element 940, based on the received metadata 904, for which to display the foveated image data 902. For example, the expander 936 uses the metadata 904 to determine groupings of rows and columns of the display element 940, to establish macropixels spanning m×n pixels that are concurrently loaded with common image values. In some embodiments, the expander 936 sets grouped demultiplexing parameters for grouping sets of m columns, and control codes for performing grouped gate scanning to group sets of n rows, to establish m×n macropixels. In some embodiments, the metadata 904 may directly indicate numbers of rows and columns to be grouped by the expander 936. In other embodiments, where the metadata 904 does not directly indicate the grouping of rows and columns (such as in cases where the metadata 904 indicates a center of the display in a GFR display), the expander may determine which rows and columns of the display to be grouped based on the metadata 904. In some embodiments, the expander 936 is implemented as part of the data processing circuit 615 illustrated in FIG. 6.

In some embodiments, by expanding the foveated image data after it is transmitted to the DDIC 930, the amount of image data needed to be transmitted may be reduced. For example, because the foveated image data is to be displayed using macropixels in which every pixel within the macropixels is loaded with the same image data simultaneously, the foveated image data 902 does not need to indicate pixel values for each native pixel of the display. Instead, the foveated image data 902 may only need to contain pixel data values of each micropixel of the image to be displayed, resulting in a lower number of pixel values that need to be transmitted for each image.

As discussed above, an m×n macropixel may correspond to a grouping of m columns and n rows of the display, such that all pixels in the intersection of the m columns and n rows are programmed with the same image data simultaneously, as if they were a single pixel. In some embodiments, the m columns of the display are grouped using grouped demultiplexing (GDX), which is discussed in greater detail below. The n rows of the display are grouped using grouped gate scanning (GGS), which the gate lines of multiple rows are grouped together, such that data from the data lines of the display is written to the pixels of each of the grouped rows concurrently, resulting in each of the grouped rows receiving the same image data. By grouping different sets of rows and columns at different portions of the display, different display regions having different effective resolutions (e.g., different sized macropixels) can be created.

Figure 10:
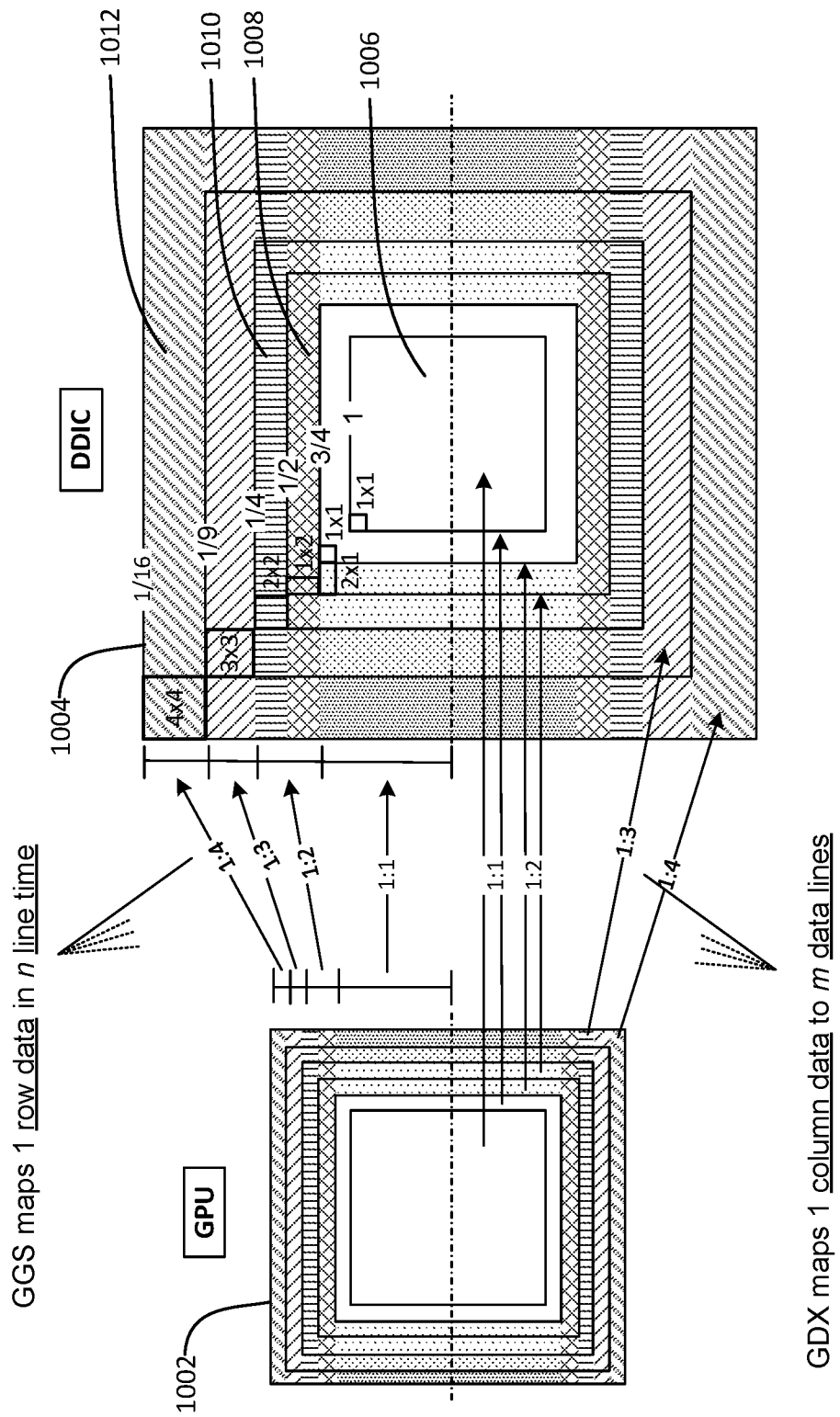
FIG. 10 illustrates a diagram showing an example of expanding image data to be displayed on a foveated display having macropixels of different sizes, in accordance with some embodiments.

FIG. 10 illustrates a diagram showing an example of expanding image data to be displayed on a foveated display having macropixels of different sizes, in accordance with some embodiments. As shown in FIG. 10, the image data 1002 (which may correspond to the image data 902 illustrated in FIG. 9 received by the GPU) may be in a compressed format. For example, the image data 1002 may specify, for each macropixel to be displayed, a single pixel value corresponding to the image data to be applied to all pixels of the macropixel, reducing a total number of pixels of the image data 1002 and reducing an amount of data to be transmitted between the GPU/DPU and DDIC. The image data 1002 is expanded at the DDIC (e.g., by the expander 936) to generate the image data 1004, based on the received metadata indicating macropixel groupings to be displayed. For example, as shown in FIG. 10, the image data 1004 includes a plurality of display regions, each having a different effective resolution resulting from different groupings of rows and columns to produce macropixels of different sizes. In some embodiments, the size and locations of the display regions may be selected based upon an expected field of view of the user's eye when viewing the display. For example, in some embodiments, a central display region of the display may be selected to correspond to approximately 20 degrees of the user's field of view in the horizontal and vertical directions.

The number of rows and number of columns that are grouped together can be independently configured in different regions of the display, to create macropixels of different sizes. For example, in a center region 1006, no grouping of rows or columns is performed, such that the effective resolution of the region is the same as the native resolution. However, in region 1008, the foveated display groups sets of two rows together, while columns remain ungrouped, creating 1×2 macropixels in these regions, resulting in an effective resolution that is half that of the native resolution. Similarly, in regions 1010, the foveated display groups sets of two columns and sets of two rows, creating 2×2 macropixels, resulting in the regions having an effective resolution that is ¼ that of the native resolution. This extends outwards to regions 1012, corresponding to corner regions that are farthest away from the center region 1006, in which sets of four rows and sets of four columns are grouped together, resulting in ¹⁄₁₆ effective resolution. In some embodiments, the expander configures the grouping of rows and columns based on the position of each region within the image data, based upon the received metadata. For example, in some embodiments, where column grouping is applied across an entire row, for rows with mixed resolution (e.g., 1×1 pixels and 2×1 pixels), column grouping may be implemented based upon the higher resolution, such that image data for each lower-resolution pixel of the row (comprising a plurality of native pixels spanning multiple columns) is provided over separate time periods, instead of concurrently. As the data provided via the signal line to the data lines is constant over the separate time periods, some power savings relative to programming the higher-resolution pixels of the row may be achieved.

Figure 11A:
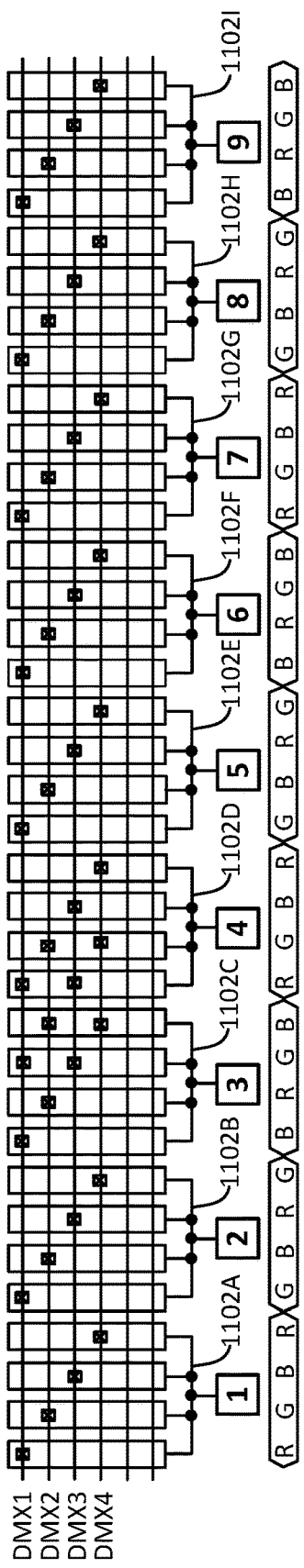
FIGS. 11A and 11B illustrate diagrams showing different configurations in which the demultiplexers can be coupled to the data lines of the display, in accordance with some embodiments.
Figure 11B:
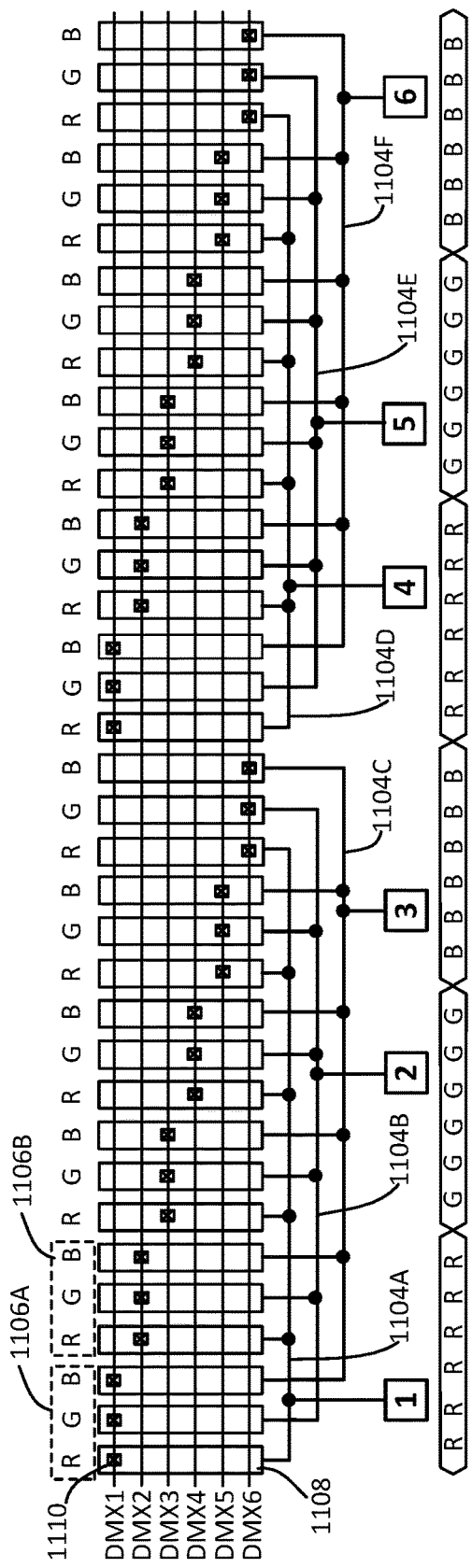

As discussed above, in some embodiments, the data lines of the display are connected to a plurality of demultiplexers (e.g., demultiplexers 716 illustrated in FIG. 7A), which provide data from the signal lines (e.g., signal lines 748/624) of the DDIC to the data lines in a time-multiplexed fashion. FIGS. 11A and 11B illustrate diagrams showing different configurations in which the demultiplexers can be coupled to the data lines of the display, in accordance with some embodiments. In the first example shown in FIG. 11A, each demultiplexer 1102 (demultiplexers 1102A through 1102I) connects a respective signal line of the DDIC to four data lines of the display, where each data line corresponds a color channel for a particular column of pixels. In the embodiment shown in FIG. 11A, each demultiplexer is connected to data lines corresponding to different color channels. For example, the first demultiplexer 1102A is connected to the Red, Green, and Blue data lines for a first column of pixels, and the Red data line for a second subset of pixels, while the second demultiplexer 1102B is connected to the Green and Blue data lines for the second column of pixels, and the Red and Green data lines for a third column of pixels. The demultiplexers 1102 are controlled using the control signals DMX1 through DMXn (e.g., DMX1 through DMX4), which are activated in sequence to cause each of the demultiplexers 1102 to provide the data of its respective signal line to a corresponding data line.

In accordance with some embodiments, grouping columns of the display using grouped demultiplexing (GDX) comprises configuring the demultiplexers that provide data from the signal lines of the DDIC to the data lines of the display to provide the same data to multiple pixels concurrently. In some embodiments, to facilitate the ability for the same data to be provided to different pixels (e.g., pixels of different columns to be grouped together to form a macropixel), the demultiplexers, instead of being connected to data lines corresponding to different color channels, are configured to be connected to the same color channel for different pixels, such that each demultiplexer is able to provide image data for a particular color channel for a plurality of pixels simultaneously. FIG. 11B illustrates an example arrangement of demultiplexers with which GDX may be performed, in accordance with some embodiments. As shown in FIG. 11B, each of the demultiplexers 1104A-F are each configured to receive image data corresponding to a single color channel (Red, Green, or Blue), and to provide the image data to up to six different data lines corresponding to six different columns of pixels, based on received control signals DMX1 through DMX6. Because each demultiplexer is associated with only a single color channel, each pixel is connected to three different demultiplexers via respective data lines (e.g., a first multiplexer configured to provide Red channel image data to the pixel, a second multiplexer configured to provide Blue channel image data to the pixel, and a third demultiplexer configured to provide Green channel image data to the pixel), and can be programmed based on activation of a single control signal of the control signals DMX1 through DMX6. For example, when the control signal DMX1 is activated, the data lines for a first pixel 1106A are loaded with R, G, and B color channel data via demultiplexers 1104A, 1104B, and 1104C. In some embodiments, each of the demultiplexers 1104 is implemented using long metal segments 1108 extending beneath the control lines DMX1 through DMXn (e.g., DMX1 through DMX6), each connected to a control line via a respective contact 1110. In some embodiments, the metal segments 1108 extending beneath the plurality of control lines enable easy layout modification, as each segment can be connected to any of the control lines based on the placement of the contacts 1110.

By configuring the demultiplexers to be only provide any data for a particular color channel to its connected data lines, each signal line connected to a demultiplexers only provides image data for that particular color channel. This may serve to reduce an amount of power needed to drive the display panel, as changes in image data values for the same color channel of adjacent pixels is typically small, particularly when displaying image content with large areas of flat textures, in comparison to changes in image data values of different color channels. For example, in some embodiments, the power consumption of the display is based on an amount of current used to drive the data lines, which is a function of the toggling frequency of the source driver and data lines, and a voltage difference for each conversion at the source driver and data lines. When each signal line provides data corresponding to a particular color channel for adjacent pixels of the display, the toggling frequency and voltage difference are reduced, lowering power consumption.

Figure 12A:
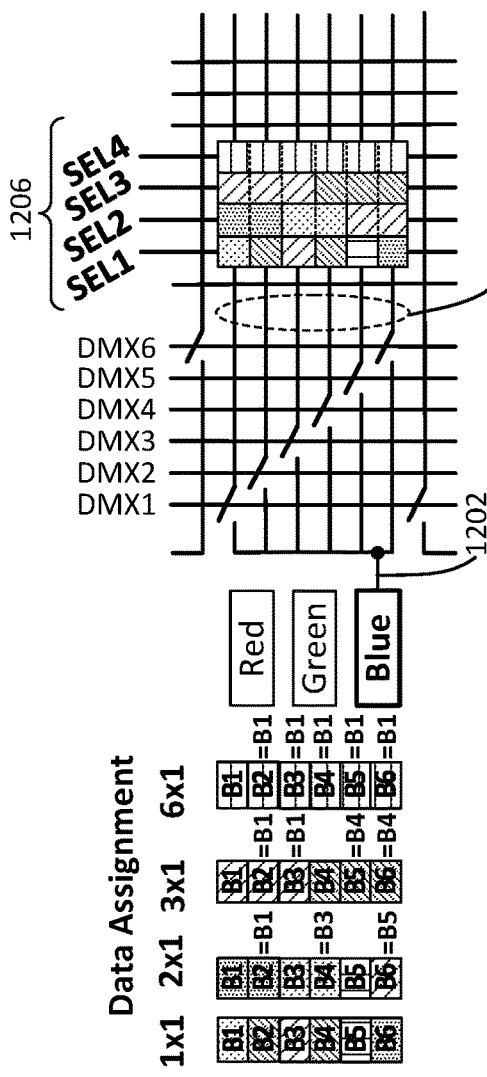
FIGS. 12A and 12B illustrate diagrams showing how the demultiplexers of the display are controlled to perform GDX, in accordance with some embodiments.
Figure 12B:
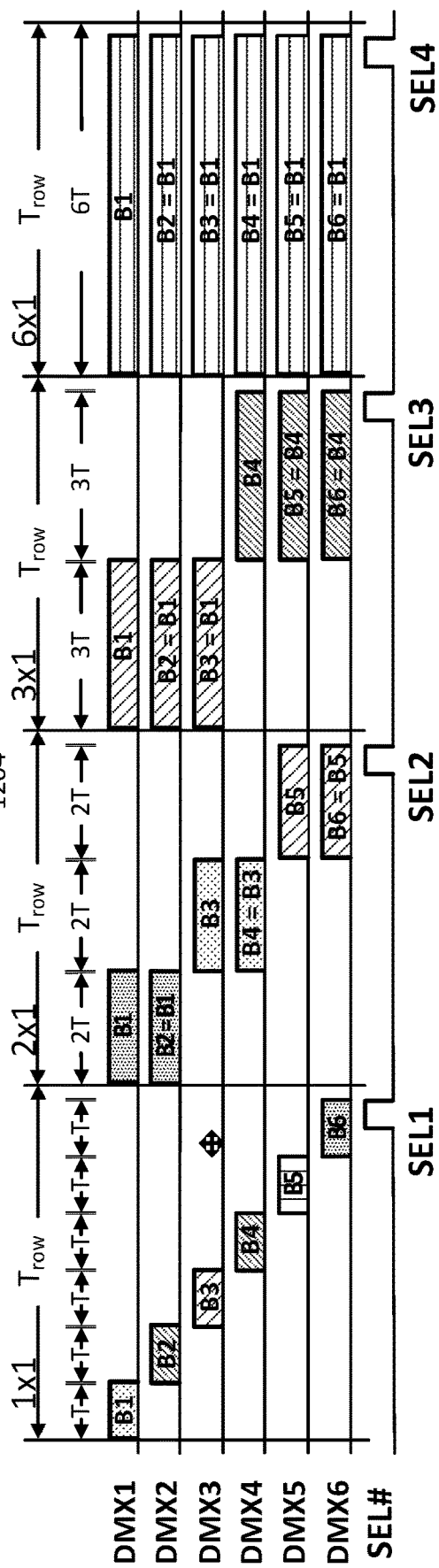

FIGS. 12A and 12B illustrate diagrams showing how the demultiplexers of the display are controlled to perform GDX, in accordance with some embodiments. FIG. 12A illustrates a demultiplexer 1202 where, for ease of illustration, the data lines connected to the demultiplexer 1202 are shown extending in the horizontal direction, and gate lines of the display as extending in the vertical direction, even though pixels along a same data line are still referred to as a column, and pixels along a same gate line are referred to as a row. The demultiplexer 1202 is configured to provide blue color channel data to a plurality of data lines 1204 (e.g., six data lines) connected to the blue subpixels of a plurality of pixel columns (e.g., six pixel columns), based on the timing of the control signals DMX1 through DMX6. The specific pixels of the columns onto which the data is loaded during a given time period is based on which gate line 1206 of the display is active during the time period. In some embodiments, during different row periods $T_{row}$, different timings of demultiplexer control signals may be used, to allow for different rows to contain different groupings of pixels. For example, FIG. 12A illustrates an example in which, for six data lines controlled by the demultiplexer 1202, no grouping of pixels is performed for pixels on a first row, groupings of two is performed for pixels on a second row, groupings of 3 is performed for pixels on a third row, and grouping of six is performed for pixels on a fourth row.

FIG. 12B illustrates a timing diagram showing control signal timings for grouping different combinations of pixels illustrated in FIG. 12A when performing GDX, in accordance with some embodiments. As shown in FIG. 12B, over each of a plurality of row periods $T_{row}$, data is loaded onto the data lines 1204 by the demultiplexer 1202, based on the control signals DMX1 through DMX6, which is written to the pixels of one or more rows based on which gate lines 1206 (e.g., SEL1, SEL2, SEL3, or SEL4 corresponding to first, second, third, and fourth rows) are activated during the row period. During the first row period, during which no pixel grouping is performed, the control signals for the demultiplexer DMX1 through DMX6 are provided in sequence, allowing for the demultiplexer 1202 to provide via the signal line different image data (e.g., data values B1 through B6) to be loaded onto each data line. Each control signal is activated for period of time T, which corresponds to an amount of time sufficient to charge a data line. As discussed above, because the demultiplexers of the display load data onto their respective sets of data lines in parallel, the row period $T_{ROW}$ may be based on a loading time used by a particular demultiplexer to load data onto its data lines (e.g., based on 6T).

By controlling the timing of the control signals DMX1 through DMX6, pixels of adjacent columns can be grouped and concurrently provided with the same image data. For example, to group pairs of pixels on adjacent columns, multiple control signals are provided concurrently, and the demultiplexer 1202 provides the same image data to multiple data lines concurrently. For example, as shown in FIG. 12B, during a second row period $T_{ROW}$, the control signals DMX1 through DMX6 are activated in pairs (e.g., DMX1 with DMX2, DMX3 with DMX4, and DMX5 with DMX6), such that the demultiplexer 1202 couples the signal line to a pair of data lines 1204 at a time (e.g., to provide data value B1 to the data lines corresponding to DMX1 and DMX2, data value B3 to the data lines corresponding to DMX3 and DMX4, and data value B5 to the data lines corresponding to DMX5 and DMX6), such that data from the signal line is provided to both data lines concurrently. In addition, as coupling the signal line to multiple data lines at a time may increase charging time need to load the data onto the data lines, each pair of control signals is provided for a longer period of time (e.g., ~2T) compared to when only a single control signal is provided at a time. However, as the number of transitions is decreased due to the control signals being provided in pairs, the total row period $T_{ROW}$ is not increased.

As shown in FIG. 12B, during a third row period, the control signals DMX1 through DMX6 are activated in sets of three, each set provided over a time period of ~3T, such that the demultiplexer 1202 couples the signal line to three data lines 1204 at a time to create 3-column macropixels (e.g., a first macropixel provided data value B1 comprising pixels on data lines corresponding to DMX1, DMX2, and DMX3, and a second macropixel provided data value B4 comprising pixels on data lines corresponding to DMX4, DMX5, and DMX6). In addition, during a fourth row period, the control signals DMX1 through DMX6 are all activated together (e.g., over a time period of ~6T) to create a macropixel spanning six columns. For example, as shown in FIG. 12A, when all control signals DMX1 through DMX6 are activated, the demultiplexer 1202 provides the same signal line value (e.g., B1) to all six of its connected data lines 1204 simultaneously, which are loaded onto the pixels for a particular row of the display when the gate select signal (e.g., SEL4) for the row is received.

Figure 12C:
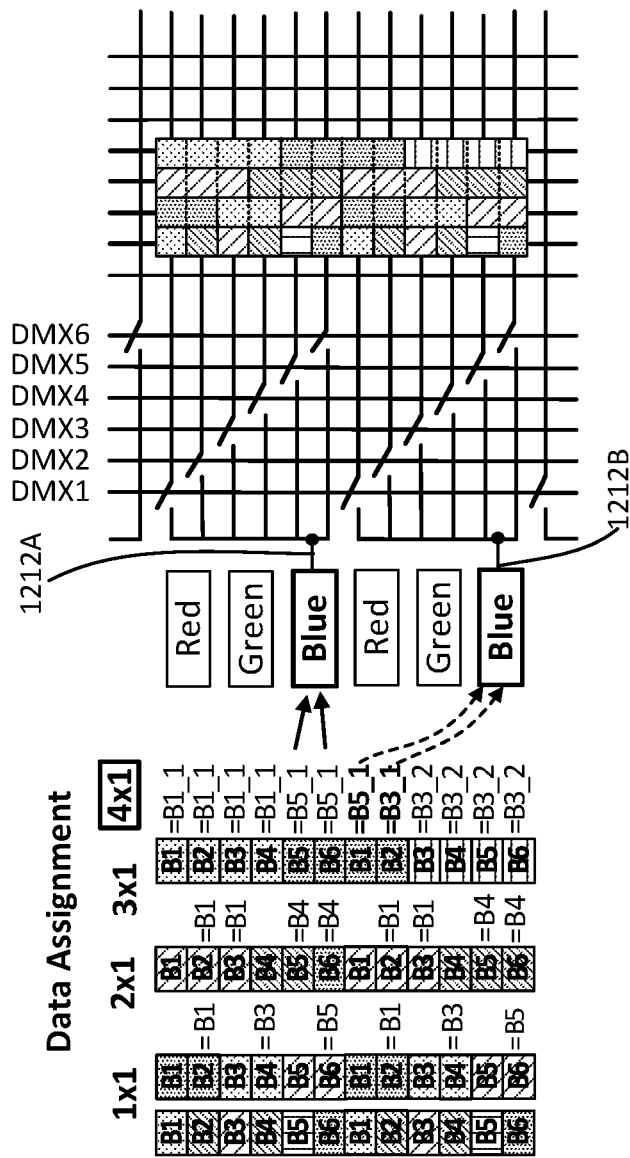
FIGS. 12C and 12D illustrate diagrams showing how the demultiplexers of the display are controlled to create 4-pixel macropixels, in accordance with some embodiments.
Figure 12D:
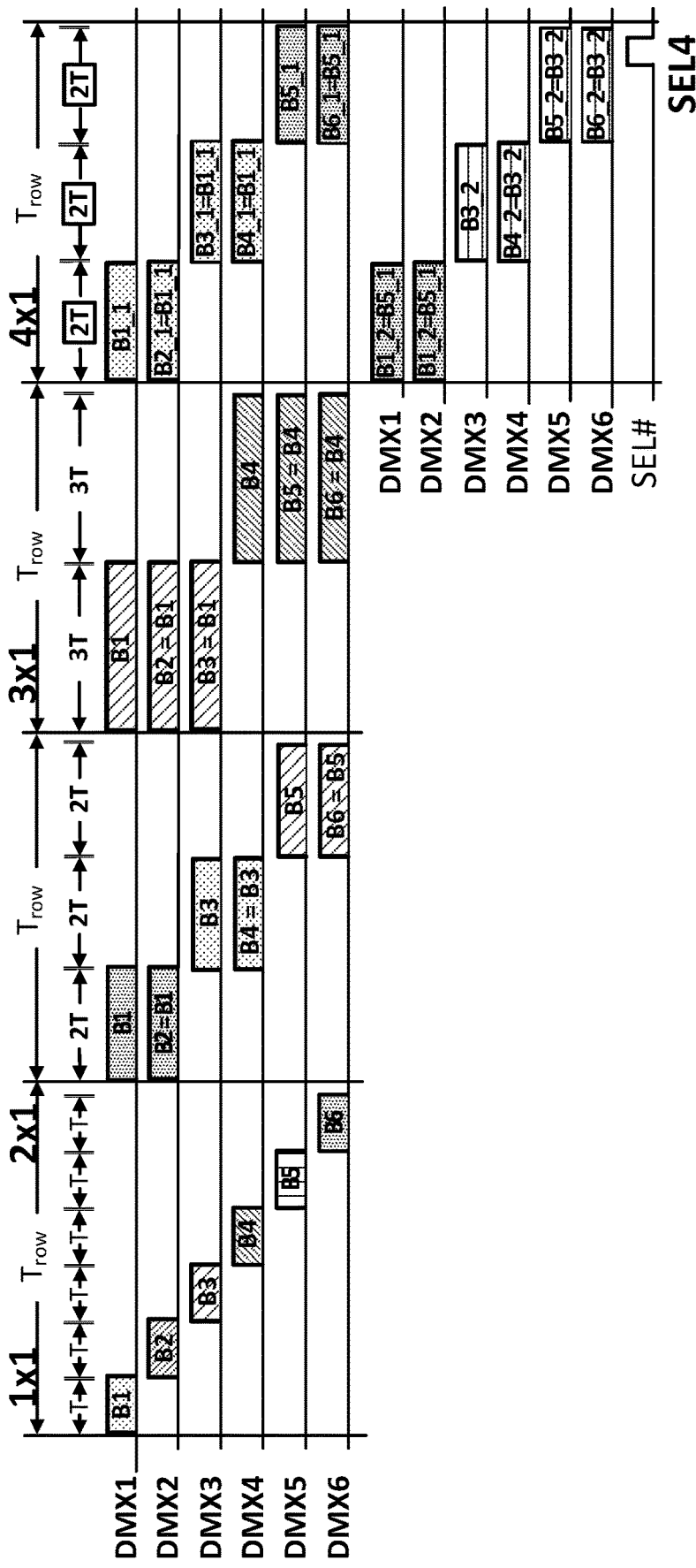

For embodiments such as that illustrated in FIGS. 12A and 12B in which each demultiplexer is connected to six data lines, 2-column, 3-column, and 6-column macropixels can be constructed by grouping demultiplexer control signals in groups of 2, 3, or 6, as 2, 3, and 6 divide evenly into 6. FIGS. 12C and 12D illustrate diagrams showing how the demultiplexers of the display are controlled to create 4-pixel macropixels, in accordance with some embodiments. As shown in FIG. 12C, as 4 does not divide evenly into 6, when creating multiple 4-column macropixels, some of the macropixels may span data lines corresponding to different multiplexers. For example, FIG. 12C illustrates a first demultiplexer 1212A for providing blue channel data to a first set of six data lines, and as second demultiplexer 1212B for providing blue channel data to a second set of six data lines. The control signals DMX1 through DMX6 are shared between all of the demultiplexers, including first demultiplexer 1212A and second demultiplexer 1212B, which can be used to provide data to pixels on their respective sets of data lines, as individual pixels (no grouping), 2-column macropixels, 3-column macropixels, and 6-column macropixels (not shown in FIG. 12C) in the same manner as discussed above in relation to FIGS. 12A and 12B. In addition, because the control signals DMX1 through DMX6 are shared by the demultiplexers, the 4-column macropixel is implementing using 2× timing, during which each demultiplexer provides data from its respective signal line to a pair of data lines. In some embodiments, this may be performed instead of grouping four data lines, as the data lines to be grouped for each demultiplexer may be different, creating potential conflict.

Although FIGS. 11A-12D shown demultiplexers connected to six data lines each, it is understood that in other embodiments, each demultiplexer may be configured with a different number of branches. In some embodiments, the number of branches per demultiplexer is selected based on a time period T sufficient to charge a data line of the display, and a desired row period $T_{ROW}$ (which may be based on a desired refresh rate for the display).

As discussed above, an m×n macropixel (corresponding to a grouping of m columns and in rows of the display) may be created by grouping m columns of pixels using GDX, and grouping n rows of pixels using GGS. In some embodiments, the gate lines of each row of pixels of the display may be configured to pass through an enable pulse that is shifted sequentially between the rows of the display when it is received at the row, or to "skip" the enable pulse when it is received at the row, but instead pass through the enable pulse when it is also passed through by an adjacent row, thus grouping the row with the adjacent row, so that both rows write data from the data lines onto their respective pixels concurrently.

Figure 13:
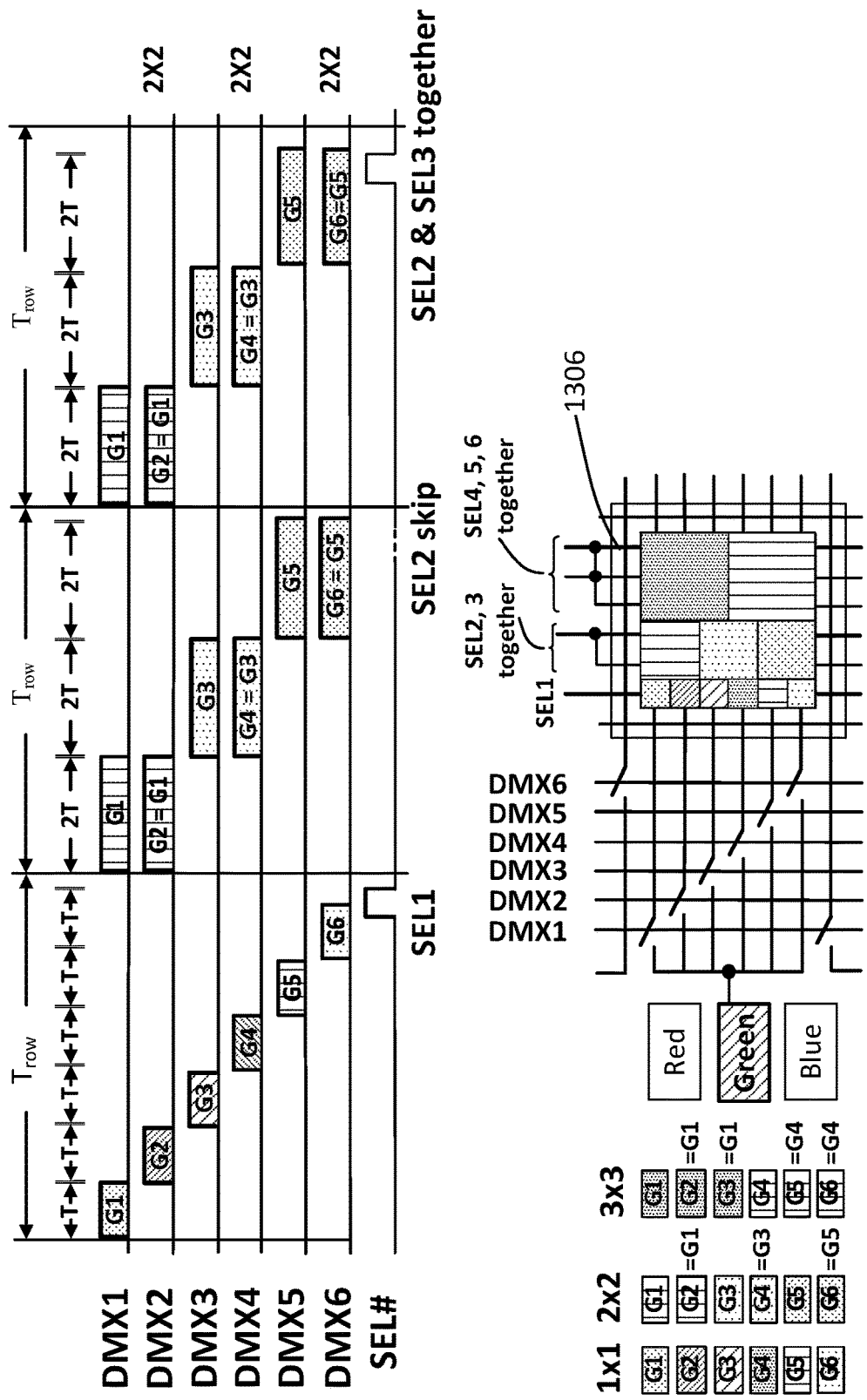
FIG. 13 illustrate diagrams showing how the combination of GDX and GGS is usable to create macropixels of various sizes, in accordance with some embodiments.

FIG. 13 illustrate diagrams showing how the combination of GDX and GGS is usable to create macropixels of various sizes, in accordance with some embodiments. FIG. 13 illustrates a demultiplexer 1302 configured to provide green channel data to a set of six data lines 1304, based upon control signals DMX1 through DMX6. The control signals are activated sequentially to load data onto each data line individually (no grouping), or grouped to create multi-column macropixels (e.g., 2-column macropixels or 3-column macropixels), similar to as discussed above in relation to FIGS. 12A and 12B. FIG. 13 also illustrates a timing diagram showing control signals received by the demultiplexer 1302 and provided to the gate lines 1306, which are used to construct macropixels of different sizes.

The gate lines 1306 of the display may be grouped to create multi-row macropixels. For example, FIG. 13 illustrates that the gate selection line for a first row is not grouped with any other rows, and provides an enable signal (SEL1) when the enable pulse is received at the row. On the other hand, the gate circuitry for a second row is configured to be coupled to gate circuitry for a third row, such that instead of passing through the enable pulse when it is received at the second row, it passes through the enable pulse when it is received at the third row. Consequently, when the enable pulse is received at the second row, it is "skipped" and not passed through to the gate line of the second row (shown in FIG. 13 as "SEL2 skip"). Instead, when the enable pulse is received at the third row, it is passed through to the gate lines of both the third row and the second row (SEL2 & SEL3), allowing for the loaded onto the data lines at that time to be written to the pixels of both rows, creating macropixels that span two rows. FIG. 13 further shows the gate select lines of a fourth, fifth, and sixth rows coupled together using similar principles, so that all three rows are written to when the shifting gate select signal is received at the last row of the group (e.g., the sixth row), in order to create 3-row macropixels.

As shown in FIG. 13, by combining GDX and GGS, macropixels of various sizes can be formed. For example, when control signals are configured to cause the demultiplexer 1302 to provide image data from the signal line concurrently to pairs of data lines during row periods in which the gate lines of two rows are grouped together, 2×2 macropixels are formed. Similarly, 3×3 macropixels are formed when the demultiplexer 1302 provides signal line data to sets of three data lines at a time and the gate lines of a set of three rows are grouped together. It is understood that macropixels of other sizes (e.g., 2×3 macropixels, 3×2 macropixels, etc.) can be formed using similar techniques.

In some embodiments where the gate select lines of multiple rows are grouped, the demultiplexer 1302 may be used to load signal line data onto the data lines over multiple row periods. For example, as illustrated in FIG. 13, because SEL2 is skipped during the second row period but is instead provided in conjunction with SEL3 during the third row period, data line data to be written to the pixels of these two rows is loaded over two row periods instead of one. In some embodiments, this may allow for dynamic changes in row period duration to improve display refresh rate, and/or reduced source driver bias current to improve power consumption, both of which will be discussed in greater detail below.

Figure 14:
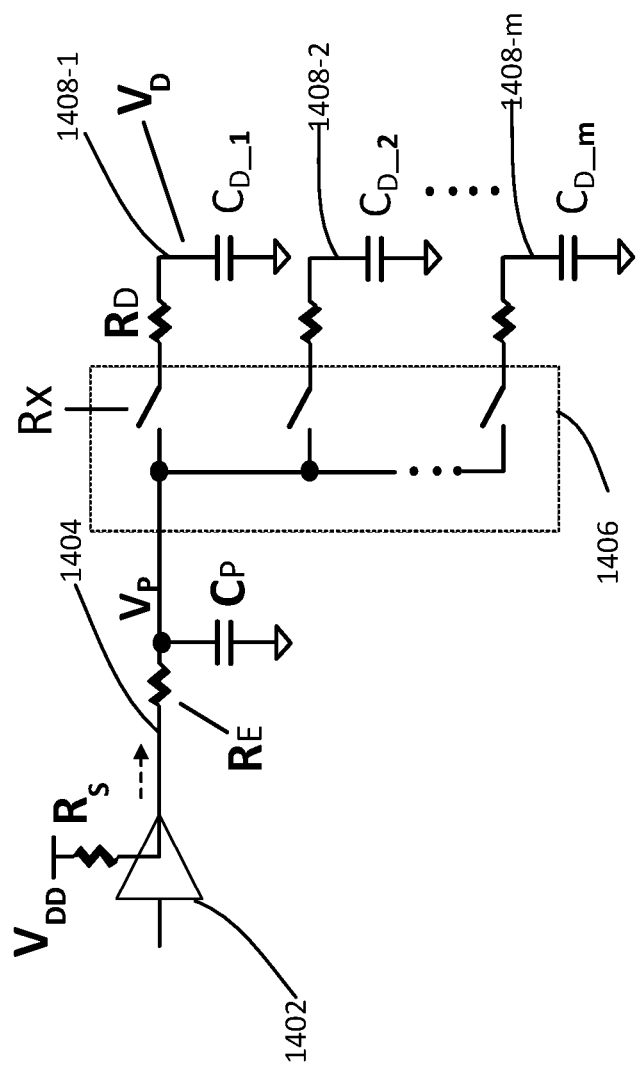
FIG. 14 illustrates a high level diagram showing electrical properties of a signal line, demultiplexer, and set of data lines, in accordance with some embodiments.

FIG. 14 illustrates a high level diagram showing electrical properties of a signal line, demultiplexer, and set of data lines, in accordance with some embodiments. A source driver 1402 provides a source bias current for driving the signal line 1404 and any of the data lines 1408 (e.g., data lines 1408-1 through 1408-$m$) connected to the signal line 1404 via the demultiplexer 1406. An amount of time needed to charge each data line 1408 of the display is based on a time constant τ, which depends on the impedances associated with the source driver (such as source driver (SD) equivalent resistance $R_S$, SD output electrostatic discharge (ESD) resistance $R_E$, and SD output pad capacitance $C_P$), as well as impedances associated with the demultiplexer and data lines (such as demultiplexer equivalent resistance $R_X$, data line resistance $R_D$, and data line capacitance $C_D$). In some embodiments, τ may be calculated as $\tau=(R_S+R_E)\cdot C_P+(R_S+R_E+R_X+R_D)\cdot C_D$. However, in cases where the demultiplexer selects multiple data lines in parallel, the value of the time constant τ does not scale linearly. For example, where m data lines are selected in parallel, τ may be calculated as $\tau_m=(R_S+R_E)\cdot C_P+(m\cdot(R_S+R_E)+R_X+R_D)\cdot C_D$. In other words, $m\cdot\tau_1 > \tau_m$. Because charging time does not scale with the number of data lines being charged at once, using the demultiplexers to group multiple data lines that are charged together can be used to reduce line time (increasing a refresh rate of the display, or allowing the display to contain additional pixel rows without decreasing refresh rate), or reduce power consumption of the display (e.g., by lowering a source bias current used when charging multiple data lines).

Figure 15A:
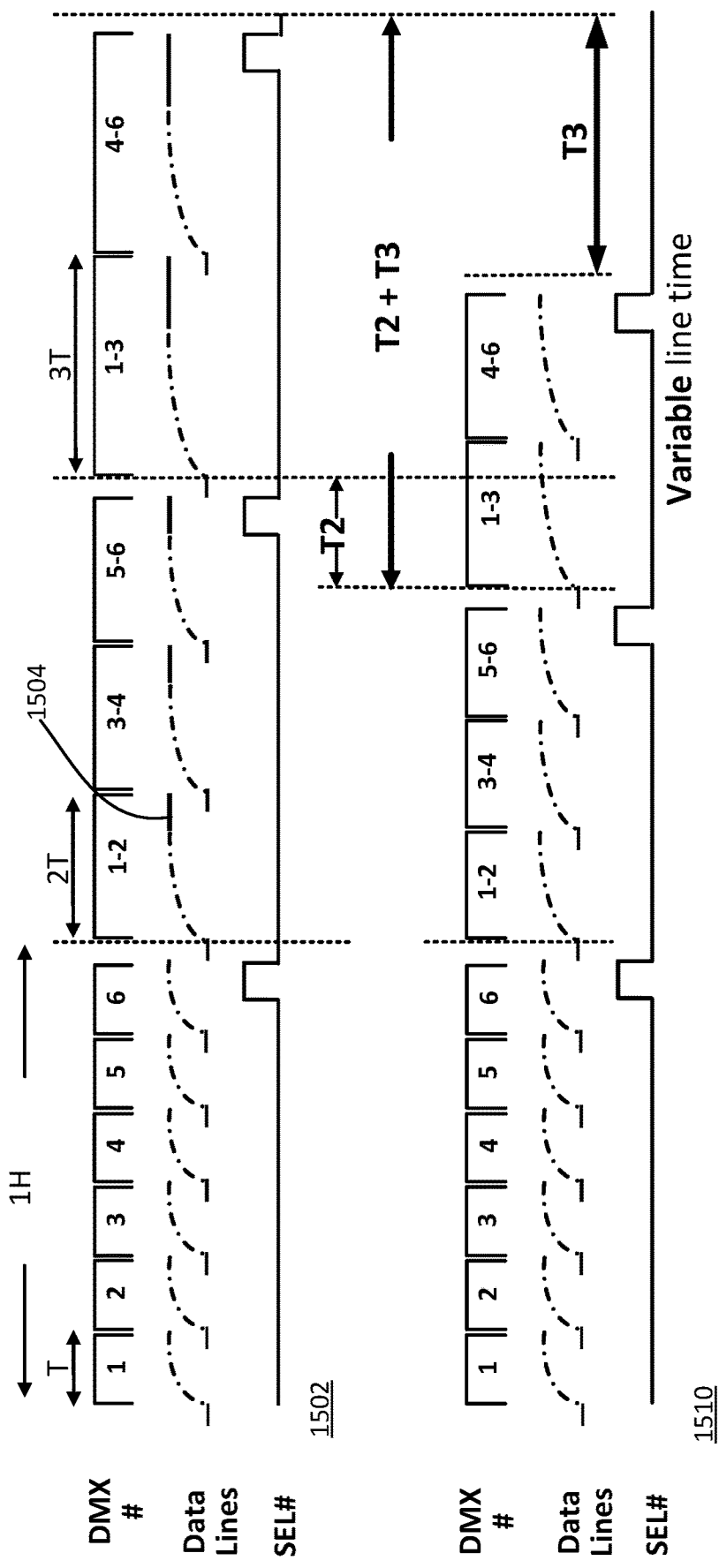
FIG. 15A illustrates an example of how line time may be reduced when GDX is performed, in accordance with some embodiments.

FIG. 15A illustrates an example of how line time may be reduced when GDX is performed, in accordance with some embodiments. FIG. 15A illustrates a first timing diagram 1502 showing control signals and data line voltages over three row periods, similar to the first three row periods illustrated in FIG. 12B. As shown in FIG. 15A, the row period $T_{row}$ corresponding to when no grouped demultiplexing or grouped gate scanning is to be performed is shown as "1H." During the first row period, no grouped demultiplexing is performed, and each control signal DMX1 through DMX6 is provided sequentially, each for a time period T that is sufficient to charge each of the corresponding data lines based on the time constant $\tau_1$ (e.g., $T \approx 5\tau_1$). However, during the second and third row periods, grouped demultiplexing is used to group sets of two and three control signals respectively, to provide signal line data to sets of two and three data lines at a time. As shown in FIG. 15A, where each set of two or three data lines is allotted time 2T or 3T respectively, each set of data lines is able to fully charge before the end of the allotted time period, resulting in extraneous flat periods 1504 during which charging has been completed.

FIG. 15A further illustrates a second timing diagram 1510 showing control signals and data line voltages over three row periods in which the length of the row periods is variable based on the level of grouped demultiplexing that is performed, in accordance with some embodiments. In the diagram of FIG. 15A, the length of the row periods during which grouped demultiplexing is performed is reduced by an amount Tm, where m corresponds to a number of grouped data lines (so that each set of two/three grouped data lines is allocated less than 2T/3T to charge), to allow for the data lines to fully charge while reducing or eliminating flat periods 1504 during which no charging occurs. For example, in some embodiments, $T2 \approx 6 \times 5\tau_1 - 3 \times 5\tau_2$, and $T3 \approx 6 \times 5\tau_1 - 2 \times 5\tau_3$. In some embodiments, the DDIC dynamically adjusts the duration of a row period of the display for different rows (e.g., by configuring a timing of the enable pulse), based on a level of GDX being performed on the pixels of the row (e.g., using the timing controller 610 illustrated in FIG. 6).

Figure 15B:
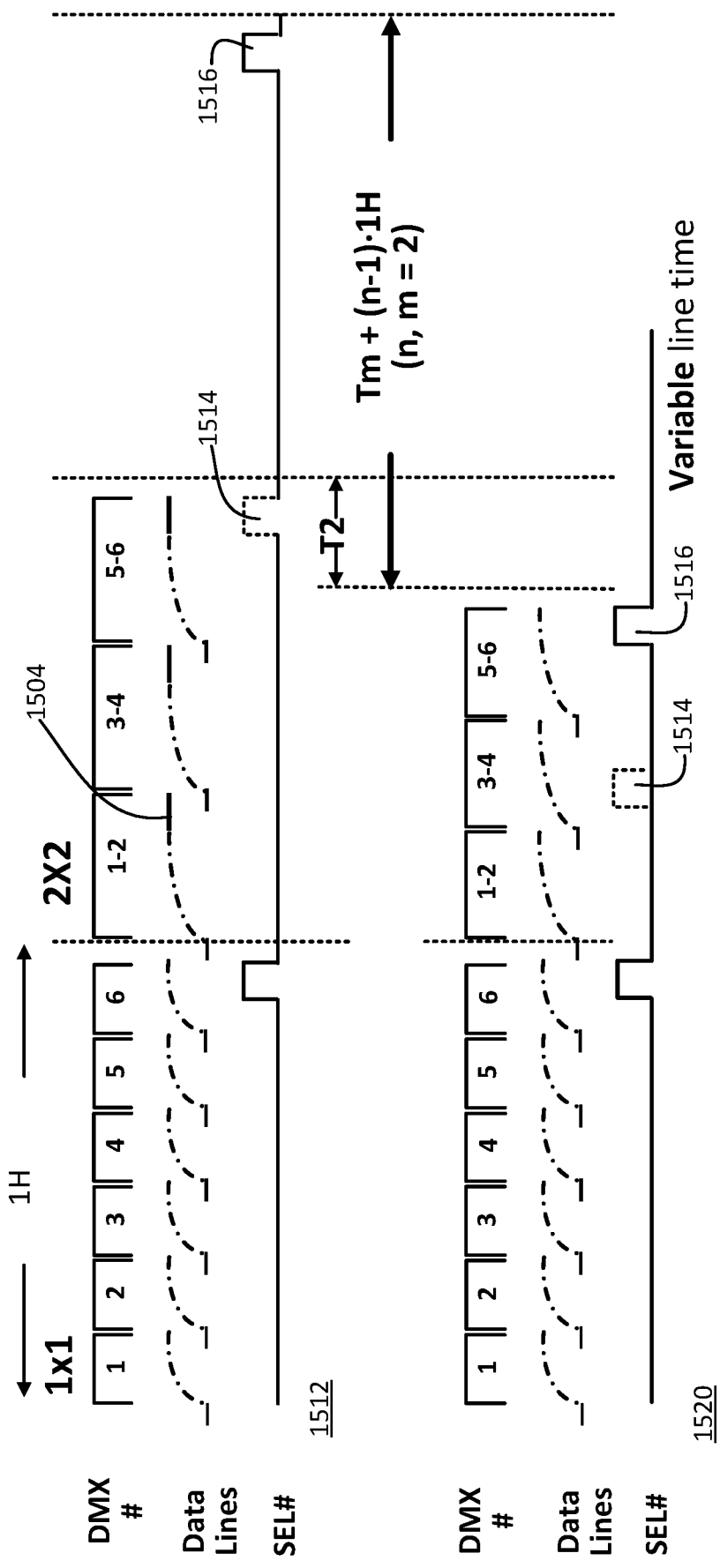
FIG. 15B illustrates an example of how line time may be reduced when GDX and GGS are performed, in accordance with some embodiments.

FIG. 15B illustrates an example of how line time may be reduced when GDX and GGS are performed, in accordance with some embodiments. As discussed above, GGS involves the grouping of gate lines of multiple rows, such that data from the data lines of the display is written to the pixels of each of the grouped rows concurrently, resulting in each of the grouped rows receiving the same image data. FIG. 15B illustrates a first timing diagram 1512, where during the first row period, no grouped demultiplexing is performed, and each control signal DMX1 through DMX6 is provided sequentially, each for a time period T that is sufficient to charge each of the corresponding data lines (e.g., $T \approx 5\tau_1$). However, during the second and third row periods, grouped demultiplexing is used to group sets of two control signals to provide signal line data to sets of two data lines at a time, and grouped gate scanning is used to group two rows together, such that the enable pulse is skipped 1514 during the second row period, and provided together with the enable pulse 1516 during the third row period (similar to as illustrated in FIG. 13). This grouping of two data lines and two rows creates a row of 2×2 macropixels. As shown in FIG. 15B, because the data lines may be fully charged within one row period 1H, they do not need to be further charged during the additional row periods (e.g., third row period) associated with the grouped rows. As such, the DDIC may dynamically adjust the duration of a row period such that the enable signals of the grouped rows are received within a 1H period. For example, the total time for grouping n rows using GGS may be reduced from n×1H to 1H, resulting in a time savings of (n−1)·1H. As such, when GDX and GGS are used in combination, the time savings may be expressed as Tm+(n−1)·1H (e.g., T2+1H, when n and m are both 2).

The reduced row period of certain rows increases the overall the refresh rate of the display. In some embodiments, the reduced row period for rows containing grouped pixels (via GDX, GGS, or both) may result in the display having, for a given supply voltage, a higher refresh rate than would otherwise be possible if no pixel grouping was to be performed (e.g., if the display were to display image data entirely using native resolution), due to a minimum amount of time needed to charge the data lines of each demultiplexer individually. Alternatively, in foveated displays in which it is known that at least a certain amount of grouped demultiplexing will be performed to create macropixels, the display may be built with a larger number of rows, while maintaining at least a minimum refresh rate that is higher than what would otherwise be possible if no pixel grouping was to be performed. For example, in embodiments where the display contains a first region displaying using macropixels generated using grouped demultiplexing and a second area with native resolution (e.g., no grouped demultiplexing), reducing a time used to display rows containing pixels grouped using grouped demultiplexing may allow for additional charging time to be allotted to areas of native resolution on the display. This may allow for the display area of the display to include a larger number of rows and have each row be allotted sufficient charging time, without increasing the overall refresh rate of the display.

In some embodiments, the DDIC, when using the metadata to synthesize the locations of macropixels to be displayed by the display, determines a row period duration to allot to each row of the display, based a size of a macropixel to be displayed on the row. For example, in some embodiments, the greater the grouping of data lines using grouped demultiplexing, the greater the row period for a row on which the image data is to be written can be reduced. In addition, the row period may be further reduced based upon the number of rows of the displayed grouped using grouping gate scanning. In some embodiments, the DDIC configures the duration of the row period by configuring the timing of the demultiplexer control signals (e.g., DMX1 through DMX6) and a clock rate controlling the shifting of the enable pulse between rows of the display.

Figure 16A:
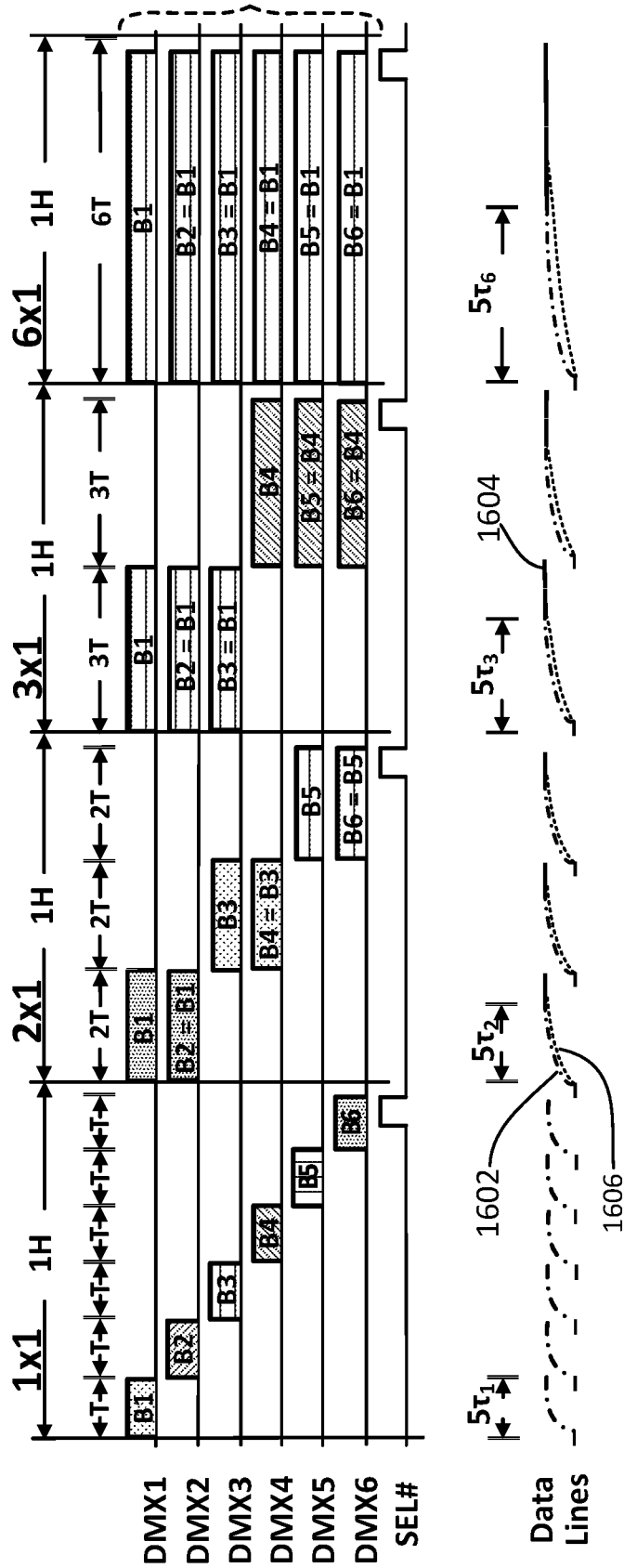
FIG. 16A illustrates a timing diagram showing different row periods during which different levels of grouped demultiplexing is performed, in accordance with some embodiments.

In some embodiments, grouped demultiplexing can be used to reduce power consumption of the display (e.g., by lowering a source bias current used when charging multiple data lines). FIG. 16A illustrates a timing diagram showing different row periods during which different levels of grouped demultiplexing is performed, in accordance with some embodiments. The control signals shown in FIG. 16A are similar to those of FIG. 12B, in which no demultiplexing is performed during a first row period, and different levels of grouped demultiplexing are performed during second, third, and fourth row periods to produce 2-column, 3-column, and 6-column macropixels, respectively. While the increased loading of concurrently charging multiple data lines decreases charging slew rate, resulting in longer charging time, the increase, as discussed above, is not linear. In some embodiments, the time required for the data lines to be fully charged is approximately five time constants (e.g., $5\tau_n$, where n corresponds to a number of data lines being charged in parallel). For example, as shown in the data line voltage level curves 1602 of FIG. 16A, single data lines are each able to fully charge in $T \approx 5\tau_1$. On the other hand, groupings of two, three, and six data lines are able to fully charge in $5\tau_2$, $5\tau_3$, and $5\tau_6$, which are less than 2T, 3T, and 6T time respectively, resulting in flat periods 1604 during which charging has been completed. In some embodiments, instead of reducing the row period, e.g., as described in relation to FIG. 15, the flat periods 1604 may be reduced by reducing a source driver bias current used to charge the data line, reducing a charging slew rate of the data lines (as shown by modified voltage charging curves 1606), such that the time needed for the data lines to fully charge is more closely aligned with the allotted time periods (e.g., 2T, 3T, or 6T). In addition, by lowering the bias current when charging data lines for certain rows, a power consumption level of the display is reduced.

Figure 16B:
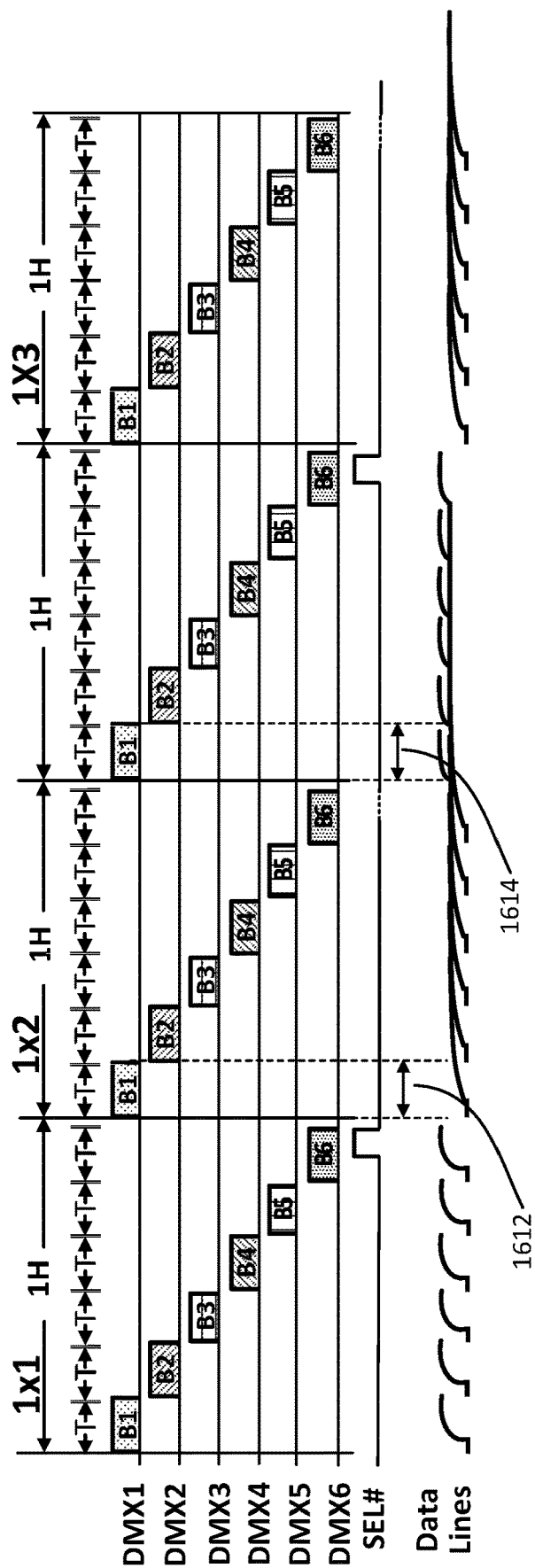
FIG. 16B illustrates a timing diagram showing different row periods during in which different sets of rows are grouped using GGS, in accordance with some embodiments.

In some embodiments, bias current reduction may also be used in conjunction with grouped gate scanning (GGS) to effect power consumption savings. FIG. 16B illustrates a timing diagram showing different row periods during in which different sets of rows are grouped using GGS, in accordance with some embodiments. For example, FIG. 16B illustrates a first row period corresponding to a first row in which data is written to the first row by itself (no grouping), and a second row period corresponding to a second row in which no gate enable signal is provided (SEL2 skipped) due to the second row being grouped with a third row, where both rows are written to currently during a third row period (SEL2 & SEL3). Consequently, similar to as discussed above in relation to FIG. 13, data line data to be written to the pixels of these two rows may be loaded over two row periods (the second and third row periods). In embodiments in which data lines are charged over multiple row periods, such as that illustrated in FIG. 16B, the charging may occur in multiple steps. For example, the data line corresponding to DMX1 may be charged to first level during a first time period T 1612, and charged a remaining amount to fully charged during a second time period T 1614. Because the data line is able to charge over a longer time period compared to when no row grouping is performed, the source bias current provided to the signal line may be reduced, reducing power consumption, while allowing for full charging of the data line. In some embodiments, the DDIC, when using the metadata to synthesize the locations of macropixels to be displayed by the display, determines a source driver bias current to be provided during different row periods, based on a size of a macropixel to be displayed on the row (based on both GDX and GGS).

While FIGS. 15A-B and 16A-B discuss reducing row period or reducing source bias currently separately, it is understood that in other embodiments, a combination of these may be performed. For example, the embodiment illustrated in FIG. 16B, row periods in which row selection is skipped may be shortened, while still providing some extra charging time for data lines that allows for a reduction in source bias current.

Figure 17:
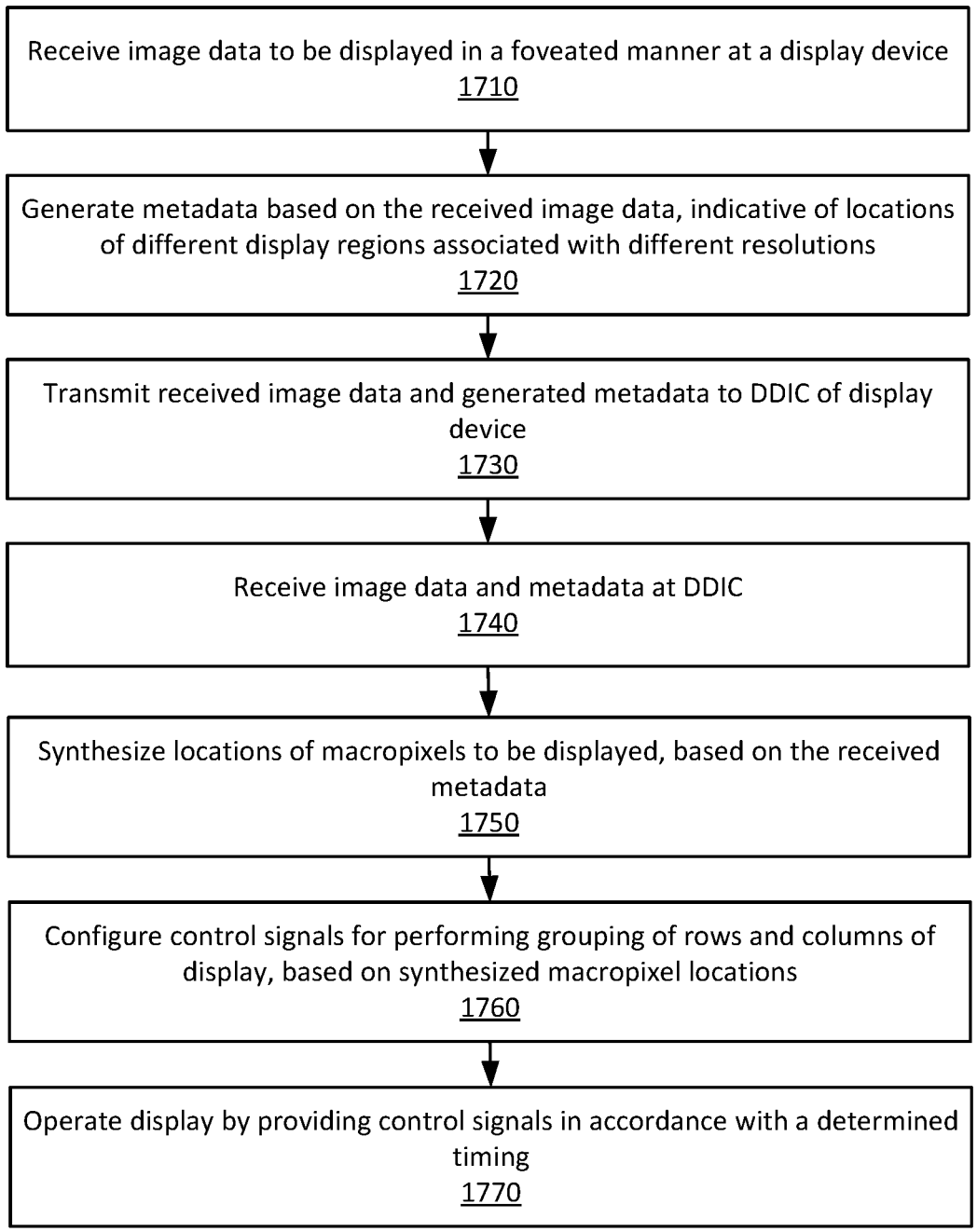
FIG. 17 is a flowchart illustrating a method of configuring a display to display foveated image data, according to some embodiments.

FIG. 17 is a flowchart illustrating a method of configuring a display to display foveated image data, according to some embodiments. In some embodiments, the method may be performed by a processor (comprising a GPU and/or a DPU) and a DDIC of a display device. The GPU and DPU may correspond to the GPU 910 and DPU 920 illustrated in FIG. 9, and the DDIC may correspond to the DDIC 510 illustrated in FIG. 6 and/or the DDIC 930 illustrated in FIG. 9

The GPU/DPU receives 1710 image data to be displayed on the display in a foveated manner. In some embodiments, the image data comprises foveated image data containing image data associated with different display regions having different resolutions. For example, in some embodiments the image data includes at least image data within a first region at a first resolution (e.g., a native resolution) and image data within a second region at a second, lower resolution.

The GPU/DPU generates 1720 metadata based upon the received image data indicative of locations of different display regions associated with different resolutions. In some embodiments, the metadata locations of two or more display regions of the display, an effective resolution and/or macropixel size of each display region, or some combination thereof. In other embodiments, the metadata may indicate a gaze location on the display.

The GPU/DPU transmits 1730 the received image data and the generated metadata the DDIC. In some embodiments, the GPU/DPU compresses the image data and the metadata using one or more display stream compression algorithms such as DSC or VDC-M to generate a stream of one or more packets, and transmits the packets to the DDIC The DDIC receives 1740 the image data and generated metadata from the GPU/DPU. In some embodiments, the DDIC receives the image data and metadata in the form of a stream of encoded packets, whereupon the DDIC decodes the packets to extract the image data and metadata The DDIC synthesizes 1750 locations of macropixels to be displayed by the display, based on the received metadata. In some embodiments, an expander module of the DDIC uses the metadata to determine which rows and columns of the display are to be grouped using grouped demultiplexing and grouped gate selection, to establish macropixels spanning m×n pixels that are concurrently loaded with common image values at specific locations on the display. In some embodiments, the metadata may directly indicate numbers of rows and columns to be grouped by the expander module. In other embodiments, where the metadata does not directly indicate the grouping of rows and columns, the expander module infers which rows and columns of the display should be grouped based on the metadata.

The DDIC configures 1760 control signals for performing grouping of rows and columns of the display, based on the synthesized macropixel locations. In some embodiments, the expander module of the DDIC sets grouped demultiplexing parameters for grouping sets of m columns, and control parameters for performing grouped gate scanning to group sets of n rows, and the timing at which these parameters are provided, to establish m×n macropixels. In some embodiments, the DDIC may further configure a row period duration and/or a source driver bias current based on the macropixel locations, e.g., to increase a refresh rate and/or reduce a power consumption of the display when writing data to pixels of rows where grouped demultiplexing and/or grouped gate scanning is performed.

The DDIC operates 1770 the display by providing the control signals to the display in accordance with a determined timing. In some embodiments, demultiplexer control signals provided to the demultiplexers allow each demultiplexer to provide signal line data to multiple data lines concurrently, grouping pixels on multiple adjacent data lines. In addition, control parameters provided to gate control circuits of rows of the display are used to selectively group the gate lines of adjacent rows together, so that a gate selection signal is provided all gate lines of the group during the same row period (e.g., when the enable pulse is received at a last row of the group). The combination of selectively grouping pixels of different columns and pixels of different rows is used to establish macropixels that span multiple columns and rows.

Figure 18:
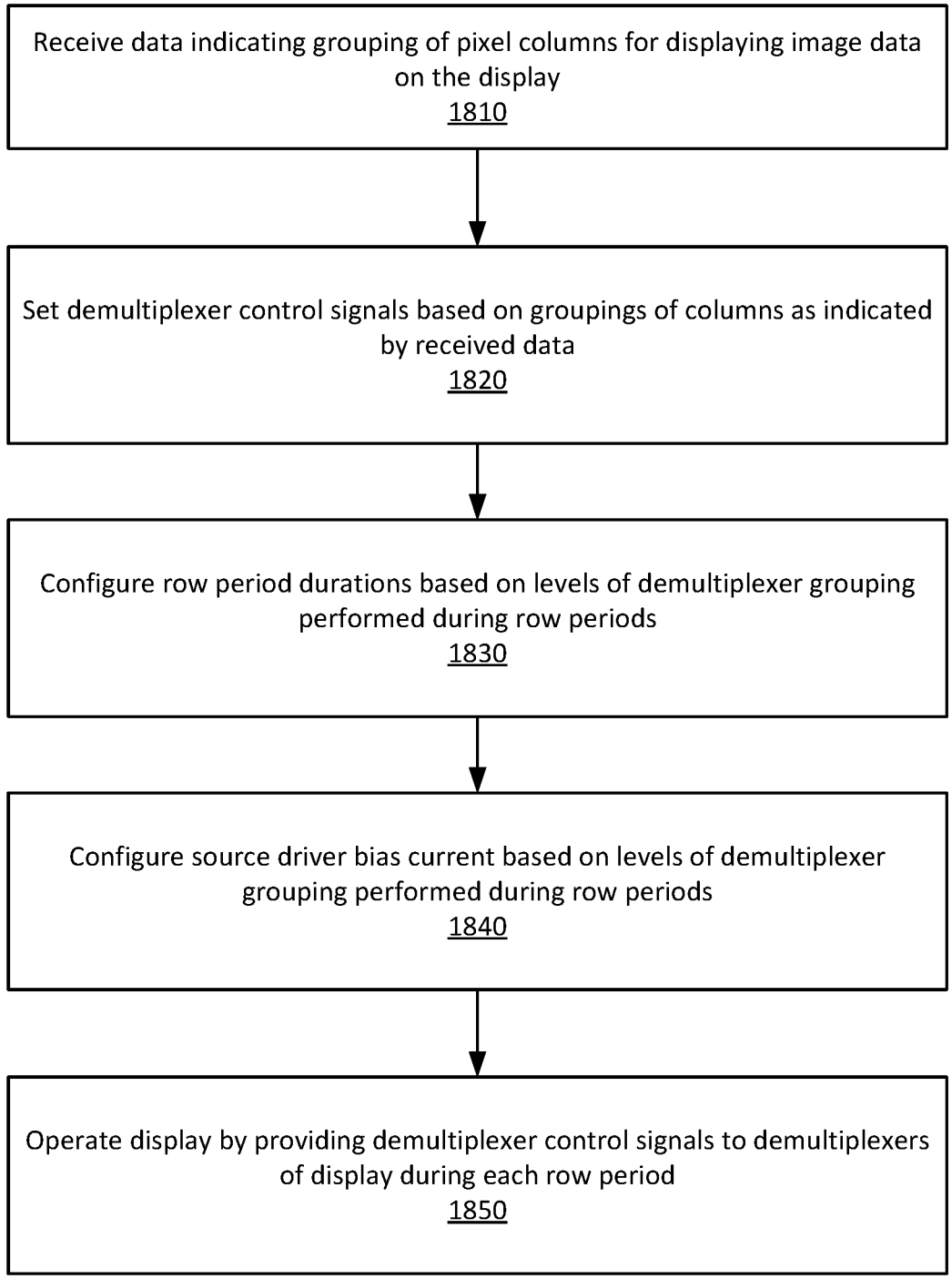
FIG. 18 is a flowchart illustrating a method of configuring a display to perform grouped demultiplexing to group pixels of adjacent columns for a display device, according to some embodiments.

FIG. 18 is a flowchart illustrating a method of configuring a display to perform grouped demultiplexing to group pixels of adjacent columns for a display device, according to some embodiments. In some embodiments, the method may be performed by a DDIC of a display device having signal lines connected to the data lines of the display via a plurality of demultiplexers. Each of the demultiplexers is coupled to a signal line configured to provide image data of a particular color channel, and to a plurality of data lines corresponding to the particular color channel for each of a plurality of pixel columns. In some embodiments, each demultiplexer is coupled to six data lines, corresponding to six different pixel columns.

The DDIC receives 1810 data indicating a grouping of pixels columns for displaying image data on the pixels of a display. In some embodiments, the data corresponds to metadata associated with received foveated image data. In some embodiments, the data is determined based on the received metadata. In some embodiments, the data indicates different groupings of columns corresponding to different row periods. For example, the display may be configured to group pixels of adjacent columns into first sets (e.g., two-column groups) over a first set of row periods, and into second sets (e.g., three-column groups) over a second set of row periods.

The DDIC sets 1820 demultiplexer control signals based on the grouping of columns as indicated by the received data. In some embodiments, the DDIC configures the control signals for each of a plurality of row periods, based upon how columns are to be grouped during each row period, which is based on which rows of the display are to contain grouped pixels of adjacent columns. For example, during row periods without grouping, the control signals are set to cause the demultiplexers to provide signal line data to each data line sequentially. On the other hand, during row periods in which grouping is to be performed, the control signals are set to cause the demultiplexers to provide signal line data concurrently to multiple data lines (e.g., sets of two, three, or six data lines concurrently).

The DDIC optionally 1830 configures a duration of one or more row periods, based a level of demultiplexer grouping to be performed during the row period. In some embodiments, the DDIC is configured to reduce a duration of a row period, based upon a time constant for concurrently charging a number data lines based upon the level demultiplexer grouping. As the time constant of charging does not scale linearly, this allows the grouped data lines to fully charge while reducing extraneous time during which the data lines are fully charged. This may serve to increase a refresh rate of the display, but reducing the duration allotted to writing to the pixels of certain rows. In addition, in some embodiments, the DDIC may further reduce a duration of a row period based upon whether the row is grouped with other rows using grouped gate selection.

The DDIC optionally 1840 configures a source bias current to be provided to the signal lines during one or more row periods, based a level of demultiplexer grouping to be performed during the row period. In some embodiments, the DDIC is configured to reduce the source bias current to be provided to the signal lines during a row period, based upon the time constant for concurrently charging a number data lines based upon the level demultiplexer grouping. As the time constant of charging does not scale linearly, this allows the grouped data lines to fully charge within the row period, while reducing overall power consumption of the display. In addition, in some embodiments, the DDIC may further reduce the source bias current based upon whether the row is grouped with other rows using grouped gate selection.

The DDIC operates 1850 the display by providing the demultiplexer control signals to the demultiplexers of the display during each row period. As the enable pulse shifts between rows of the display in accordance with the configured row period durations, the demultiplexer control signals configure which pixels of adjacent columns are grouped when writing data to pixels of the row (and any other rows grouped with the current row). By grouping pixels in this manner, macropixels spanning multiple columns are formed, and used for rendering areas of lower resolution in a foveated display. In combination with grouped rows, m×n macropixels can be formed, allowing for fine control of the effective resolution of different display regions.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method, comprising:
    receiving image data to be displayed by a display device, wherein the image data comprises a plurality of display regions associated with different image resolutions;
    generating metadata based on the received image data, wherein the metadata is indicative of locations of the plurality of display regions associated with different image resolutions;
    transmitting the image data along with the generated metadata to the display device; and
    at a display driver integrated circuit (DDIC) of the display device, where the display device comprises a display area comprising a plurality of pixels arranged in a plurality of rows and a plurality of columns:
        receiving the transmitted image data with the metadata;
        determining locations of one or more macropixels to be displayed by the display area based on the metadata, wherein each macropixel corresponds to a grouping of native pixels of the display area onto which image data is loaded to concurrently;
        configuring control signals for grouping rows and columns of the display area with a determined timing based on the determined locations of the one or more macropixels, wherein:
            the control signals include a subset of control signals for controlling a plurality of demultiplexers to group the columns based on activation timing of the subset of control signals,
            a number of demultiplexers in the plurality of demultiplexers is smaller than a number of data lines controlled by the plurality of demultiplexers, and
            each demultiplexer of the plurality of demultiplexers is configurable to drive two or more data lines concurrently when two or more control signals of the subset of control signals are activated concurrently; and
        displaying image data by providing the control signals in accordance with the determined timing.

2. The method of claim 1, wherein the metadata indicates a location on the display device corresponding to a gaze direction of a user, and further comprising, at the DDIC of the display device, determining locations of the plurality of display regions based on the gaze direction.

3. The method of claim 1, wherein the metadata indicates the plurality of display regions and respective image resolutions associated with each display region.

4. The method of claim 1, further comprising:
formatting the metadata to be compatible with a compression algorithm; and
wherein transmitting the image data along with the generated metadata to the display device comprises encoding the image data and generated metadata in accordance with the compression algorithm.

5. The method of claim 4, wherein the compression algorithm is Display Stream Compression (DSC) or VESA Display Compression-M (VDC-M).

6. The method of claim 1, wherein:
each row of the plurality of rows comprises a respective gate line configured to provide a gate enable signal to pixels of the row;
each column of the plurality of columns comprises a respective data line configured to provide image data to pixels of the column; and
each demultiplexer of the plurality of demultiplexers is connected to a signal line from a source drive circuit, and is configured to selectively couple one or more data lines of a set of data lines of a set of columns to the signal line concurrently to charge the one or more data lines in accordance with the control signals.

7. The method of claim 6, wherein the data lines of the set of data lines correspond to a common color channel of pixels of adjacent columns of the plurality of columns.

8. The method of claim 6, wherein configuring the control signals for grouping the rows and columns of the display area comprises:
configuring the subset of control signals provided to the demultiplexer to concurrently couple a plurality of data lines of the set of data lines to the signal line to concurrently charge the plurality of data lines during one or more time periods, based upon the determined locations of the one or more macropixels.

9. The method of claim 6, wherein the determined timing is based at least partially upon a timing at which an enable pulse is provided by a gate scan line sequentially to gate scan driver circuits of the plurality of rows of the display area.

10. The method of claim 9, wherein configuring the control signals for grouping the rows and columns of the display area comprises:
configuring control signals provided to the gate scan driver circuits of the plurality of rows to selectively group rows of the plurality of rows based upon the determined locations of the one or more macropixels.

11. The method of claim 9, further comprising:
configuring the timing of the enable pulse based upon the grouping of rows and columns of the display area.

12. The method of claim 11, wherein the configured timing of the enable pulse defines a refresh rate of the display device, and wherein the timing of the enable pulse in regions of the display area containing macropixels corresponding to groupings of rows and columns is configured to increase the refresh rate of the display device beyond what would be possible if the display area displayed only native resolution image data.

13. The method of claim 1, further comprising:
configuring a source driver power level of the display device based upon the grouping of rows and columns of the display area.

14. A display device, comprising:
a display area comprising a plurality of pixels arranged in a plurality of rows and a plurality of columns, each row comprising a respective gate line configured to provide a gate enable signal to pixels of the row, and each column comprising a respective data line configured to provide image data to pixels of the column; and
a display driver integrated circuit (DDIC) comprising:
a receiver configured to receive image data to be displayed by the display device, wherein the image data comprises a plurality of display regions associated with different image resolutions, and metadata indicative of locations of the plurality of display regions associated with different image resolutions;
an expander circuit configured to:
determine locations of one or more macropixels to be displayed at the display area based on the metadata, wherein each macropixel corresponds to a grouping of native pixels of the display area onto which image data is loaded to concurrently; and
configure control signals for grouping rows and columns of the display area with a determined timing based on the determined locations of the one or more macropixels;
a source driver circuit; and
a demultiplexer connected to a signal line from a source drive circuit, and configured to selectively couple data lines of a set of data lines of the respective data lines to the signal line to charge the data lines in accordance with activation timing of a subset of the control signals for controlling the demultiplexer, wherein the demultiplexer is configurable to drive two or more data lines of the set of data lines concurrently when two or more control signals of the subset of the control signals are activated concurrently,
wherein the control signals are provided to the demultiplexer to concurrently couple a plurality of data lines of the set of data lines to the signal line to concurrently charge the plurality of data lines during one or more time periods, based upon the determined locations of the one or more macropixels.

15. The display device of claim 14, wherein the metadata indicates a location on the display device corresponding to a gaze direction of a user, and wherein the expander circuit is further configured to determine locations of the plurality of display regions based on the gaze direction.

16. The display device of claim 14, wherein the metadata indicates the plurality of display regions and respective image resolutions associated with each display region.

17. The display device of claim 14, wherein the image data and the metadata are received as packets encoded in accordance with a compression algorithm comprising at least one of Display Stream Compression (DSC) or VESA Display Compression-M (VDC-M).

18. The display device of claim 14, wherein the data lines of the set of data lines correspond to a common color channel of pixels of adjacent columns of the plurality of columns.

19. The display device of claim 14, wherein the determined timing is based at least partially upon a timing at which an enable pulse is provided by a gate scan line sequentially to gate scan driver circuits connected to the respective gate lines of the plurality of rows of the display area.

20. The display device of claim 19, wherein the DDIC further comprises a timing controller configured to set the timing of the enable pulse based upon the grouping of rows and columns of the display area.

21. The display device of claim 14, wherein the DDIC is configured to modify a source driver power level of the display device based upon the grouping of rows and columns of the display area.

* * * * *